(12) United States Patent
Ashizuka

(10) Patent No.: US 9,008,282 B2
(45) Date of Patent: *Apr. 14, 2015

(54) CORDLESS TELEPHONE SYSTEM AND MONITORING SYSTEM

(71) Applicant: Panasonic Corporation, Osaka (JP)

(72) Inventor: Tetsuya Ashizuka, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/203,293

(22) Filed: Mar. 10, 2014

(65) Prior Publication Data

US 2014/0270097 A1    Sep. 18, 2014

(30) Foreign Application Priority Data

Mar. 12, 2013   (JP) .................................. 2013-048625

(51) Int. Cl.
| | |
|---|---|
| *H04M 11/00* | (2006.01) |
| *H04M 1/02* | (2006.01) |
| *H04M 1/725* | (2006.01) |
| *G08B 13/187* | (2006.01) |
| *G08B 13/24* | (2006.01) |

(52) U.S. Cl.
CPC ........ *H04M 1/0202* (2013.01); *H04M 1/72502* (2013.01); *H04M 1/72516* (2013.01); *G08B 13/187* (2013.01); *G08B 13/2491* (2013.01)

(58) Field of Classification Search
USPC ............. 379/37–44; 340/573.4; 455/462–464
See application file for complete search history.

(56) References Cited

U.S. PATENT DOCUMENTS

2005/0070272 A1 *   3/2005   Marangos ................... 455/426.2

FOREIGN PATENT DOCUMENTS

| JP | H06195573 A | 7/1994 |
|---|---|---|
| JP | H06350521 A | 12/1994 |
| JP | H0779291 A | 3/1995 |
| JP | H08167928 A | 6/1996 |
| JP | H09298769 A | 11/1997 |
| JP | H11285072 A | 10/1999 |
| JP | 2008059311 A | 3/2008 |
| JP | 2010218071 A | 9/2010 |
| JP | 2012190161 A | 10/2012 |

OTHER PUBLICATIONS

Ashizuka, T., "Cordless Telephone System and Monitoring System," Office Action mailed May 7, 2013, for JP2013-048625, 3 pages.
Ashizuka, T., "Cordless Telephone System and Monitoring System," Office Action mailed Jul. 30, 2013, for JP2013-048625, 4 pages.

* cited by examiner

*Primary Examiner* — Stella Woo
(74) *Attorney, Agent, or Firm* — Seed IP Law Group PLLC

(57) ABSTRACT

Provided is a cordless telephone system including a base unit (100) connected to a telephone line and a handset (200) configured to transmit and receive radio waves to and from the base unit (100) via wireless channel, wherein the base unit (100) or the handset (200) includes a strength measurement unit (20) configured to measure a strength of received radio waves, and a signal processing unit (10) configured to perform a prescribed security action based on a result of measurement performed by the strength measurement unit (20).

11 Claims, 15 Drawing Sheets

Fig.7
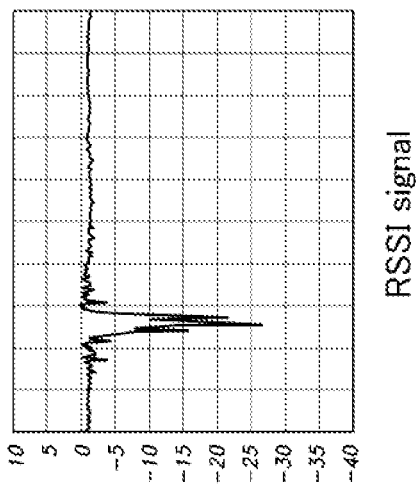
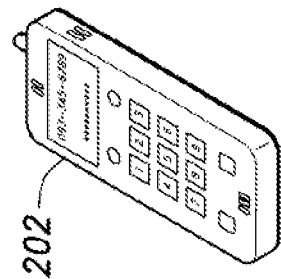
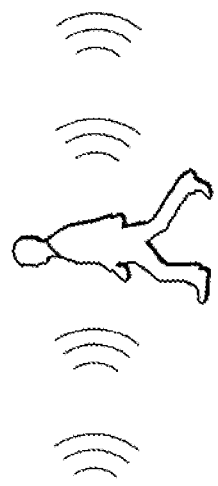
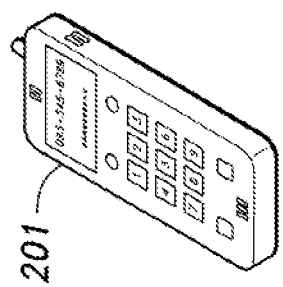

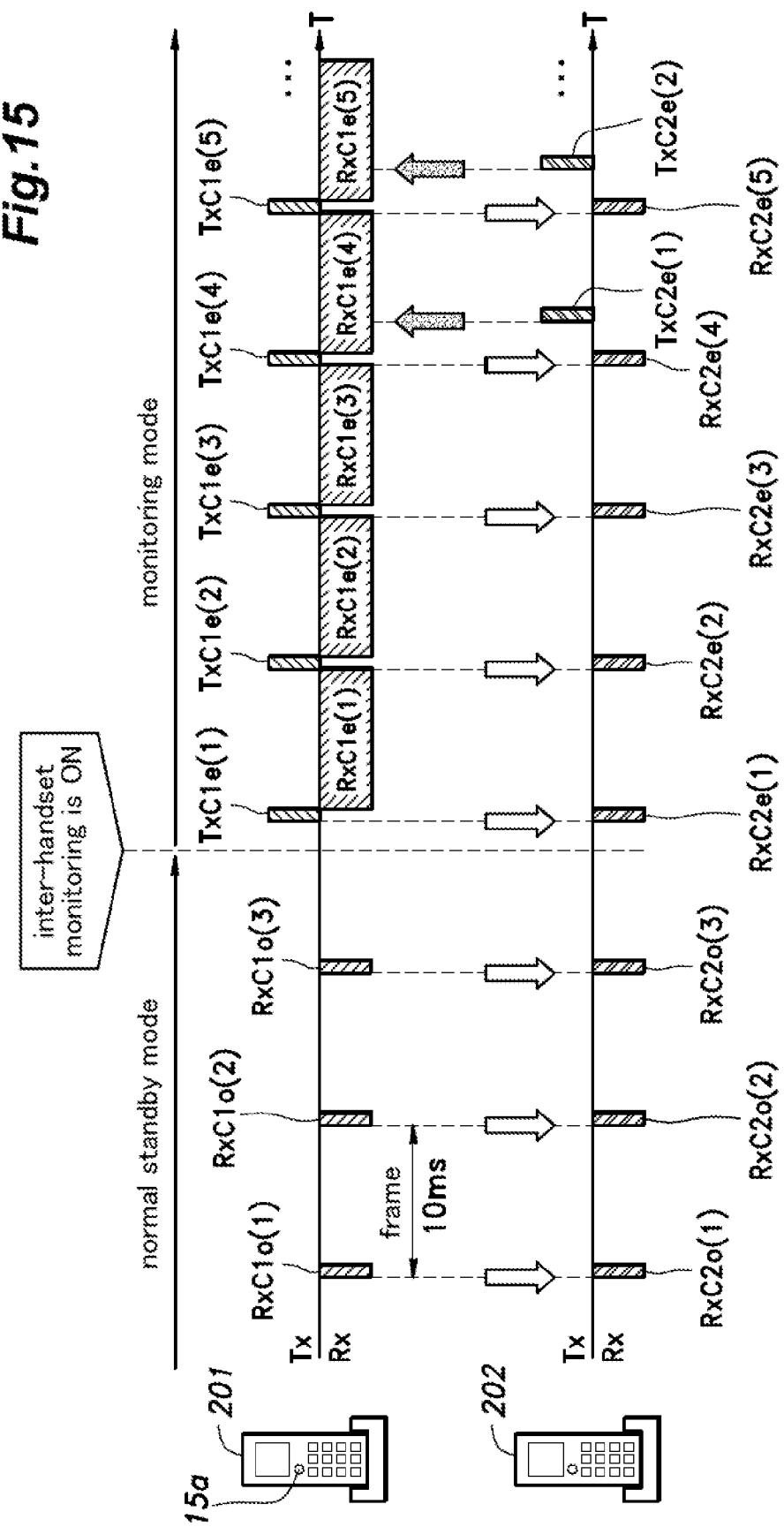

CORDLESS TELEPHONE SYSTEM AND MONITORING SYSTEM

TECHNICAL FIELD

The present invention relates to a cordless telephone system having a monitoring function and to a monitoring system.

BACKGROUND OF THE INVENTION

People's interest in crime prevention is increasing every year, and particularly, in recent years home security for protecting home from burglaries or the like is attracting high attention. As one way to achieve home security, services are provided by security companies, in which, typically, a security sensor installed in a user's house responds to entry of a burglar or the like to notify it to the security company with which the user has contracted, such that security guards are sent to the house to deal with the incident.

Aside from such relatively large-scale services provided by security companies, technology is known in which, in an intercom system including an intercom handset located near the boundary of the premises of a building and an intercom base unit located inside the building, a human body detection unit is connected to the intercom base unit to detect a human body at or near a doorway of the building and determine whether there is an abnormality (see JP2008-059311A).

Also known is technology in which a handset of a cordless telephone system is provided with an intrusion detection unit for detecting intrusion of a suspicious person or the like and a transmission unit for transmitting intrusion information acquired by the intrusion detection unit to a base unit, and the base unit is provided with a security action performing unit that, upon receipt of the intrusion information from the transmission unit, assesses the content of the information and performs a prescribed security action (see JPH07-079291A).

However, in the home security systems configured to provide home security services of security companies, typically, sensors are mounted to or near windows and doors of each house to be monitored and a management device for collecting the outputs from the sensors is installed in each house, and further, lines are necessary to connect each management device with a central device operated by the security company. Thus, the cost of laying the lines and installing the management device in each house tends to increase the total cost of the system.

The technology disclosed in JP2008-059311A can realize a security system with a relatively small-scale structure. However, the system uses, as a human body detection unit, a passive infrared sensor (which may include a pyroelectric sensor, an ultrasonic sensor, an optical sensor, a thermopile or the like), and addition of such a sensor and a circuit for processing the output from the sensor inevitably increases the cost of the system.

The technology disclosed in JPH07-079291A also can realize a system with a relatively small-scale structure. However, as is the case with the system disclosed in JP2008-059311A, the system of JPH07-079291A also uses an infrared sensor as a human body detection unit (intrusion detection unit), which leads to an increase in the cost.

SUMMARY OF THE INVENTION

The present invention is made to solve the foregoing problems in the prior art, and a primary object of the present invention is to provide a cordless telephone system capable of detecting intrusion of a burglar or the like reliably and with a simple structure, without need for a special sensor for human body detection provided to a base unit or a handset constituting the cordless telephone system.

To achieve the foregoing object, in one aspect of the present invention, there is provided a cordless telephone system, including: a base unit connected to a telephone line; and a first handset configured to transmit and receive radio waves to and from the base unit via wireless channel, wherein at least one of the base unit and the first handset includes: a strength measurement unit configured to measure a strength of received radio waves; and a control unit configured to perform a prescribed security action based on a result of measurement performed by the strength measurement unit.

According to this structure, it is possible to detect intrusion of a burglar or the like reliably and with a simple structure, without need for a special sensor for human body detection provided to the base unit or the handset constituting the cordless telephone system.

Preferably, the strength measurement unit and the control unit are provided to the first handset; the base unit and the first handset perform transmission and reception based on time division multiple access; and the control unit is configured to perform the prescribed security action based on a result of measurement performed by the strength measurement unit when control data transmitted from the base unit is received by the first handset.

According to this structure, the handset receives the control data transmitted from the base unit in the control slot period in each frame of the time division multiple access, measures the signal strength when the control data is received, and perform the monitoring based on the measured signal strength. Therefore, there is no need for a special slot specifically used for performing the monitoring, and thus, radio waves can be used efficiently.

In another aspect of the present invention, there is provided a cordless telephone system, including: a base unit connected to a telephone line; and a first handset and a second handset each configured to transmit and receive radio waves to and from the base unit via wireless channel, wherein the first handset and the second handset transmit and receive radio waves to and from each other via wireless channel, and wherein the second handset includes: a strength measurement unit configured to measure a strength of radio waves transmitted from the first handset; and a control unit configured to perform a prescribed security action based on a result of measurement performed by the strength measurement unit.

According to this structure, since the handsets are portable, it is possible to readily perform monitoring at desired locations in or around a house or the like, such as a window or a door, by appropriately placing the handsets.

Preferably, the first handset and the second handset perform transmission and reception based on time division multiple access; the first handset transmits to the second handset data for monitoring to be used in the measurement of the radio wave strength at a timing different from a timing at which control data is transmitted and received between the base unit and the first handset; and the control unit is configured to perform the prescribed security action based on a result of measurement performed by the strength measurement unit when the data for monitoring is received by the second handset.

According to this structure, the first handset and the second handset are allowed to communicate the data for monitoring (such as their respective IDs) with each other to perform monitoring therebetween independently of the monitoring performed between the base unit and handset(s).

Also preferably, the control unit is configured to obtain in advance a standard value of radio wave strength measured by the strength measurement unit, and to perform the prescribed security action when a difference between a current value of the radio wave strength measured by the strength measurement unit and the standard value exceeds a predetermined threshold value.

According to this structure, even when the signal strength is changed due to a change in the position of the handset(s), the standard value for assessing the measured signal radio wave strength changes accordingly (namely, calibration is performed), and thus, the monitoring can be performed with high accuracy.

Also preferably, the prescribed security action includes at least one of setting off an alarm sound, outputting a predetermined message, making a phone call to a predetermined party, and making notification via the wireless channel.

According to this structure, it is possible to give a warning to a suspicious person, make a notification to an appropriate party(s) such as a security company, or, when the a suspicious person is detected by the first handset, for example, allow the base unit or another handset notified of the detection via the wireless channel to emit an alarm or the like.

In another aspect of the present invention, there is provided a monitoring system, including: a transmitting unit configured to emit radio waves; and a receiving unit placed at a location spaced apart from the transmitting unit and configured to receive the radio waves emitted from the transmitting unit, wherein the receiving unit includes: a strength measurement unit configured to measure a strength of the received radio waves; and a control unit configured to perform a prescribed security action based on a result of measurement performed by the strength measurement unit.

According to this structure, it is possible to detect intrusion of a burglar or the like reliably and with a simple structure, without need for a special sensor for human body detection provided to the radio wave transmitting unit or the radio wave receiving unit constituting the monitoring system.

BRIEF DESCRIPTION OF THE DRAWINGS

Now the present invention is described in the following in terms of preferred embodiments thereof with reference to the appended drawings, in which:

FIG. 7 is an explanatory diagram showing an RSSI signal measured by the radio wave strength measurement unit of one of a first handset and a second handset when there is a person in a space between the first handset and the second handset;

FIG. 15 is an explanatory diagram showing a mode of use of the slots used by the first handset and the second handset during execution of a process relating to the security action in the cordless telephone system according to the fifth embodiment.

DETAILED DESCRIPTION OF THE PREFERRED EMBODIMENTS

First Embodiment

In the following, a first embodiment of the present invention will be described with reference to the appended drawings.

Figure 1:
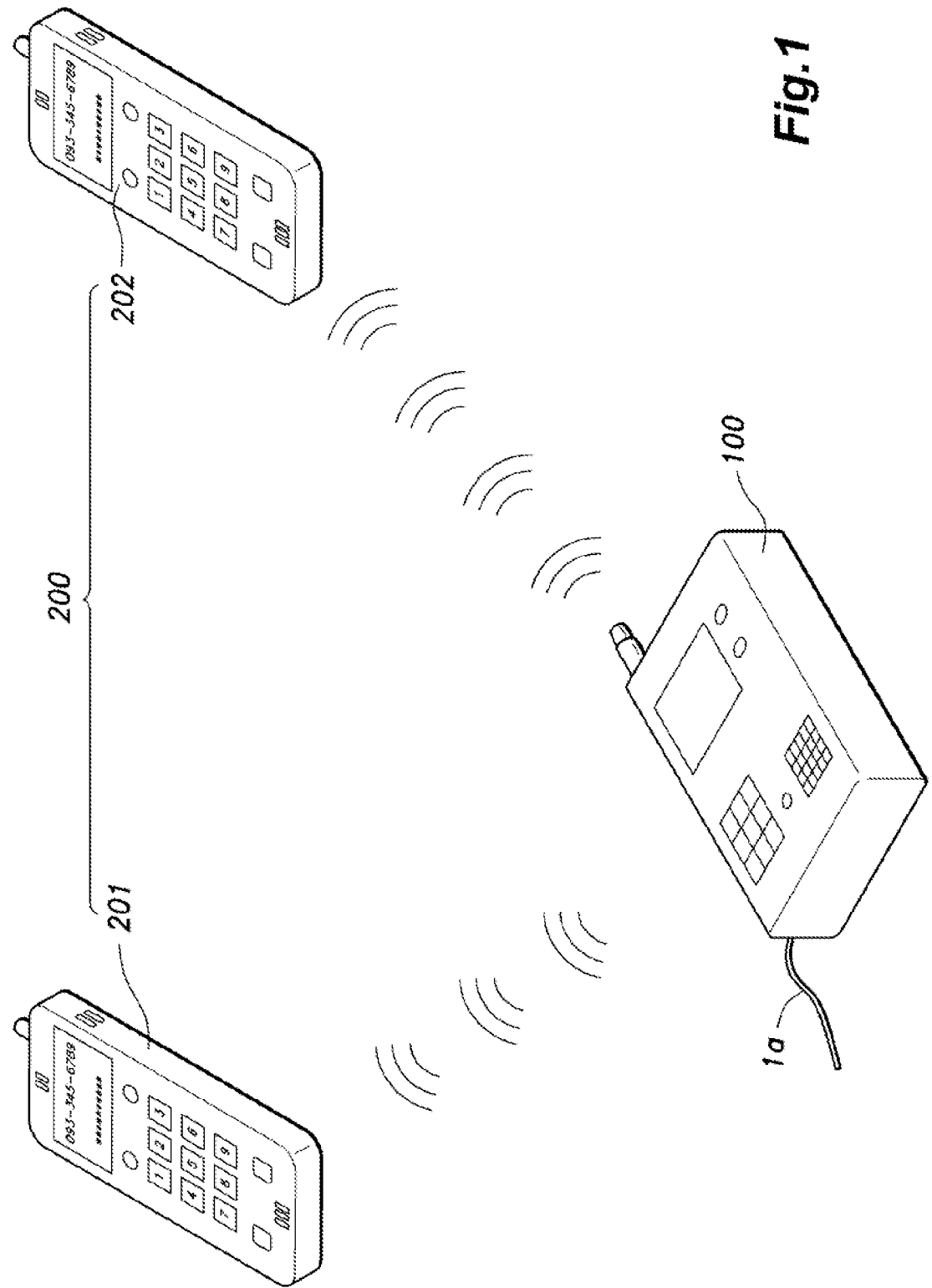
FIG. 1 is an explanatory diagram for showing a relationship between a base unit and handsets of a cordless telephone system according to the first embodiment of the present invention.

FIG. 1 is an explanatory diagram showing a relationship between a base unit 100 and handsets 200 of a cordless telephone system according to the first embodiment. As shown in FIG. 1, the cordless telephone system is constituted of a base unit 100 and two handsets 200 (first handset 201 and second handset 202). The first handset 201 and the second handset 202 have an identical structure, and in the following description, when it is not necessary to distinguish between the first handset 201 and the second handset 202, they may be referred to as the handset(s) 200. It is to be noted that the number of the handsets 200 that can be included in the system is not limited to two, and the cordless telephone system may include three or more handsets 200, for example.

The base unit 100 is connected to a public telephone line not shown in the drawings via a telephone line 1a, and communicates audio data with another telephone via the public telephone line.

The base unit 100 communicates with the handsets 200 via wireless channel, and audio data or the like is transmitted and received between the base unit 100 and each handset 200. Thereby, each handset 200 can access the public telephone line via the base unit 100. Further, the first handset 201 and the second handset 202 are configured to be capable of communicating audio data with each other via the base unit 100 or directly, so that phone calls can be made between the handsets 201 and 202.

Figure 2:
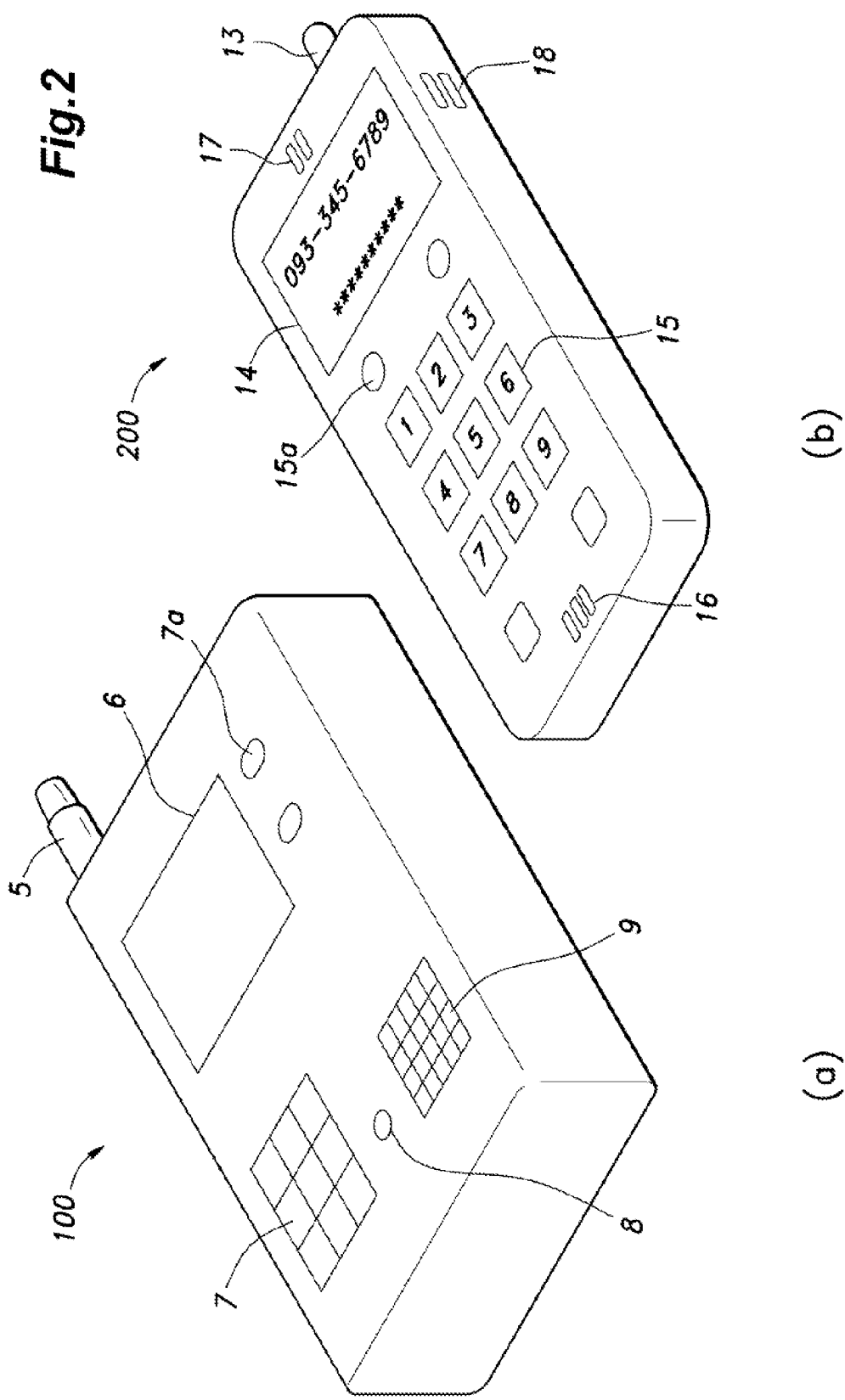
FIG. 2A is an overall perspective view of the base unit and FIG. 2B is an overall perspective view of one handset of the cordless telephone system.

FIG. 2A is an overall perspective view of the base unit 100 and FIG. 2B is an overall perspective view of one handset 200 of the cordless telephone system according to the first embodiment. In the following, with reference to FIG. 2A and FIG. 2B, explanation will be given of a general structure of the base unit 100 and the handset 200 of the cordless telephone system according to the first embodiment.

In the first embodiment, explanation will be made taking as an example a digital cordless telephone system basically conforming to DECT (Digital Enhanced Cordless Telecommunications). DECT is a standard of digital cordless telephone systems established in 2011, and uses a frequency range of 1.9 GHz band (1,895,616 KHz to 1,902,528 KHz) and TDMA (Time Division Multiple Access)-WB as a communication method. It is said that DECT can reduce communication failure caused by radio wave interference with other devices and the 1.9 GHz frequency used in DECT does not interfere with a wireless LAN or a microwave oven, and therefore, DECT can maintain the quality of communication of a facsimile, telephone or the like. Further, DECT is known as a communication method that enables a wideband communication of audio data or the like, in which the state of use of frequency channels is monitored at all times, so that the device itself can select an optimum channel, whereby frequencies can be used efficiently.

It is to be noted that the later-described detection of a suspicious person or the like into a building based on measurement of radio wave strength (hereinafter, simply referred to as "monitoring") may be implemented not only by cordless telephone systems of the DECT type, but also by cordless telephone systems of another type, such as PHS (Personal Handy-phone System) or sPHS (Super PHS), which may include the base unit 100 and the handset(s) 200 (first handset 201 and/or second handset 202).

With reference to FIG. 2A, when a user places a phone call using the base unit 100, the user searches for or input the telephone number of a party to be called by use of a display unit 6 and/or an operation unit 7 of the base unit 100 in a manner similar to when using an ordinary fixed-line phone. Once the connection is established, audio data can be communicated between the base unit 100 and another telephone connected thereto via a public telephone line. The base unit 100 is equipped with a microphone 8 through which the user's voice is input and a speaker 9 for outputting the voice of the person on the other end of the line, so that the user can talk with the person on the other end of the line in the so-called hands-free condition. It is to be noted that the illustrated base unit 100 is not equipped with a dedicated handset for use in the vicinity thereof, but the base unit 100 may have a dedicated handset which may be wired or wireless. Further, the base unit 100 is provided with a monitoring instruction button 7a, such that when the user presses the monitoring instruction button 7a, monitoring is started. After the instruction of start of monitoring, when the monitoring instruction button 7a is pressed again, the monitoring is terminated. It is to be noted that the monitoring instruction button 7a of the base unit 100 is operated when the monitoring is to be performed by use of the base unit 100 and the handset 200. In addition, when the handsets 200 to perform the monitoring have been designated by the user using the operation unit 7, for example, operation of the monitoring instruction button 7a can instruct execution of the monitoring using the designated handsets 200.

With reference to FIG. 2B, the user may use the handset 200 to transmit and receive audio data via the base unit 100. When using the handset 200 also, the user inputs or otherwise specifies the telephone number of the party to be called by use of a display unit 14 and/or an operation unit 15 of the handset 200. The handset 200 is equipped with a microphone 16 for capturing the voice to be transmitted, an audio-output speaker 17 for outputting the voice regenerated from the received signal, and a ringer speaker 18. Further, similarly to the base unit 100, the handset 200 also is provided with a monitoring instruction button 15a, such that when the user presses the monitoring instruction button 15a, monitoring is started, and thereafter, upon pressing of the button 15a again, the monitoring is terminated. The monitoring instruction button 15a of the handset 200 is operated when the monitoring is to be performed by use of the first handset 201 and the second handset 202.

The base unit 100 has an antenna (base unit antenna) 5, and transmits and receives digital audio data superimposed on a carrier wave having a predetermined frequency to and from an antenna (handset antenna) 13 provided to the handset 200. In this way, wireless communication can be performed between the base unit 100 and the handset 200. Similarly, digital audio data is also communicated between the first handset 201 and the second handset 202 mentioned above.

Figure 3:
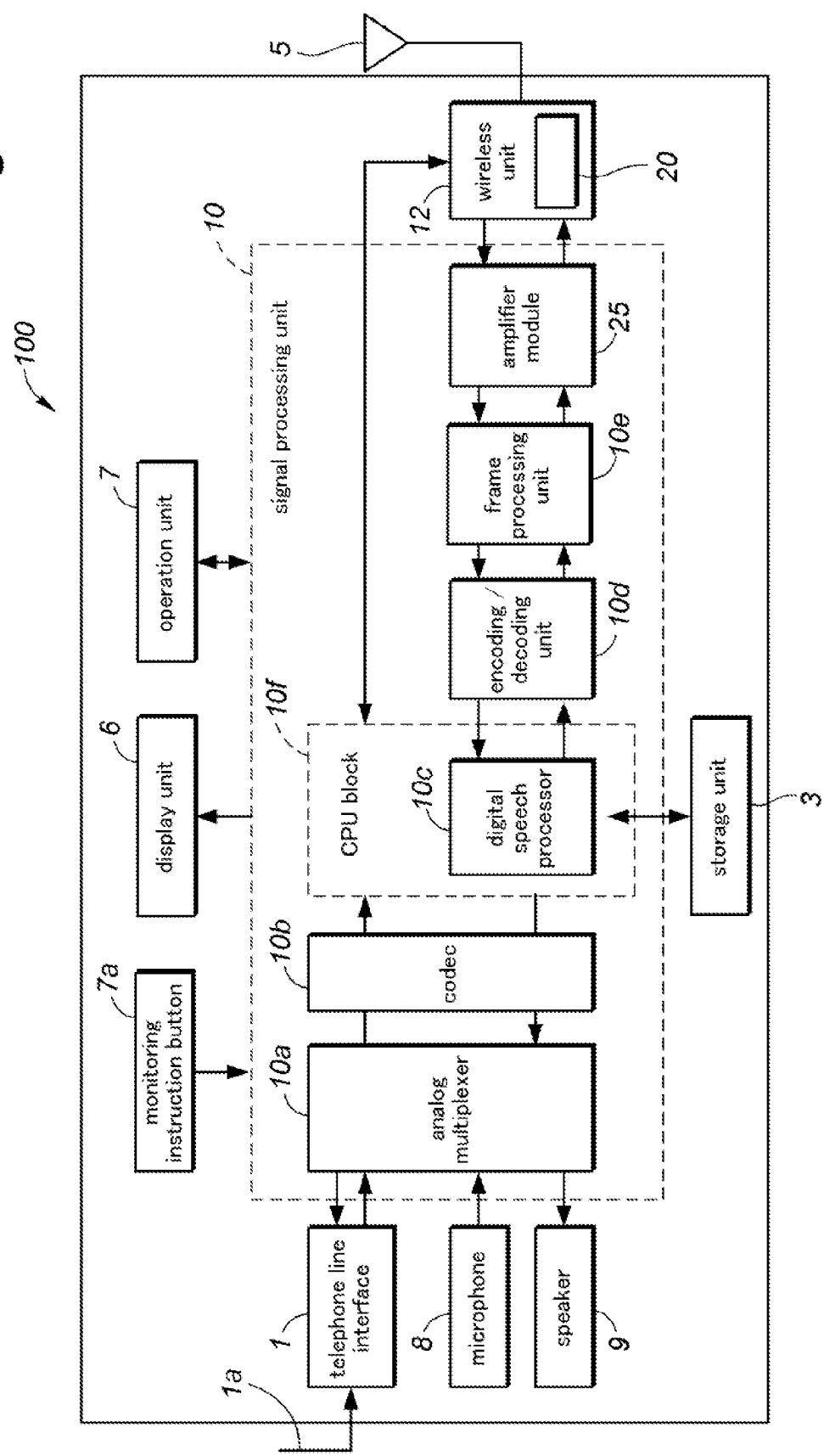
FIG. 3 is a block diagram showing a general structure of the base unit of the cordless telephone system.

FIG. 3 is a block diagram showing a general structure of the base unit 100 of the cordless telephone system. In addition to the above-described display unit 6, operation unit 7, monitoring instruction button 7a, microphone 8 and speaker 9, which serve as a user interface, and the antenna 5, the base unit 100 includes a telephone line interface 1 serving as an external interface such that the base unit 100 connects to the public telephone line via the telephone line interface 1 and the telephone line 1a. Further, the base unit 100 is provided with a storage unit 3, which may be embodied as a flash memory or the like, to store frequently accessed telephone numbers, for example. When the base unit 100 is used as an answering machine, the storage unit 3 may store the transmitted audio signal after the signal is converted into digital form. Further, the storage unit 3 stores data of alarm sound, voice message or the like to be output from the speaker 9 when, after monitoring is started, a suspicious person or the like is detected (hereinafter, this state will be simply referred to as an "abnormal state." Also, detection of a suspicious person may be expressed as "detection of an abnormality.").

The base unit 100 further includes a signal processing unit (control unit) 10, and the signal processing unit 10 includes an analog multiplexer 10a, a codec 10b, a CPU block 10f, an encoding/decoding unit 10d, a frame processing unit 10e, a digital speech processor (speech processing unit) 10c mounted on the CPU block 10f, and an amplifier module 25. In the following, description will be given of the structural elements of the signal processing unit 10. The signal processing unit 10 serves as a control unit to control the entirety of the base unit 100. For example, the signal processing unit 10 (CPU block 10f) determines whether the aforementioned monitoring instruction button 7a is pressed by polling. In the following, description will be made of the structural elements of the signal processing unit 10.

The analog multiplexer 10a selects one of the input/output channels used for the audio signal input via the telephone line interface 1, the audio signal received by the microphone 8, and the audio signal output to the speaker 9, where each of the audio signals is an analog signal.

The codec 10b is a so-called audio codec, and specifically is formed of a DA converter and an AD converter performing conversion between digital and analog signals. An analog audio signal input to the base unit 100 by the codec 10b via the telephone line interface 1 and an analog audio signal acquired by the microphone 8 are converted into digital audio signals by the AD converter. On the other hand, a digital audio signal processed digitally by the digital speech processor 10c, which will be described later, is converted by the DA converter of the codec 10b into an analog audio signal, which is output from the speaker 9.

Though not shown in the drawings, the CPU block 10f includes a CPU (Central Processing Unit), an EEPROM (Electrically Erasable Programmable Read Only Memory) storing a control program, a RAM (random access memory) serving as a work memory, and a bass connecting these component elements, and controls the overall operation of the base unit 100. Further, the CPU block 10f includes the digital speech processor 10c which processes audio signals. The digital speech processor 10c performs noise/echo cancellation, enhancement of specific audio frequencies, encryption/description, etc. on the digital audio signal obtained through AD conversion performed by the codec 10b and/or the digital audio signal decoded by the later-described encoding/decoding unit 10d.

It is to be noted that these audio signal processings are often performed as filtering processes including convolution, and a DSP (Digital Signal Processor) or the like specifically designed to perform these signal processings may be used. Of course, the CPU not shown in the drawing and the digital speech processor 10c may be embodied in a single processor. Further, the entirety of the signal processing unit 10 may be embodied as a single DSP.

The encoding/decoding unit 10d encodes a digital signal included in an output from the digital speech processor 10c to be communicated (transmitted) wirelessly via the antenna 5, and decodes a signal (which is already digitized in this embodiment) received via the antenna 5. The encoding/decoding unit 10d adopts ADPCM (Adaptive Differential Pulse Code Modulation) techniques, for example.

The frame processing unit 10e includes a TDD/TDMA (Time Division Duplex/Time Division Multiple Access) processor not shown in the drawings. The TDD/TDMA processor divides each of the periodically occurring frames into units known as slots (channels), so that multiple communications can be performed on the same frequency (time division multiple access). Thus, transmission and reception can be performed in a very short time period by sharing the same frequency, and therefore, transmission and reception may appear to be performed substantially simultaneously. Further, TDMA may be used along with FDMA (Frequency Division Multiple Access) for allocating frequency bands (or channels), thereby to provide a large number of channels while avoiding interferences between frequencies. The frame processing unit 10e switches between transmission (Tx) and reception (Rx) periodically in a short period of time. The structure of the frames used in DECT will be described later.

The switching between transmission and reception may be achieved by controlling the power supply to the amplifiers (not shown in the drawings) included in a wireless unit 12 performing modulation and demodulation or by controlling a gate circuit provided in an input stage or an output stage of each amplifier.

Further, the frame processing unit 10e includes therein a DA converter and an AD converter not shown in the drawings. The TDD/TDMA processor 10e converts with the DA converter a digital signal (transmission signal) input from the digital speech processor 10c via the coding/decoding unit 10d into an analog signal and outputs the analog signal to the amplifier module 25, and converts with the AD converter an analog signal (received signal) input from the wireless unit 12 via the amplifier module 25 into a digital signal and outputs the digital signal to the coding/decoding unit 10d. Thus, an analog signal interface including the amplifier module 25 is provided between the frame processing unit 10e and the wireless unit 12.

The wireless unit 12 includes a transmission circuit (not shown in the drawings) through which the transmission signal (analog signal) output from the amplifier module 25 is passed to the antenna 5 for emission. Further, the wireless unit 12 includes a reception circuit (not shown in the drawings) through which the received signal (analog signal) received by the antenna 5 is output to the amplifier module 25.

It is to be noted that the wireless unit 12 may include a later-described radio wave strength measurement unit (strength measurement unit) 20. In a case where the base unit 100 includes a radio wave strength measurement unit 20, the signal processing unit 10 (CPU block 10f) sets in the radio wave strength measurement unit 20 a reference value ("standard value") for assessing the measured radio wave strength, for example, and the wireless unit 12 outputs a difference between a measured value of the radio wave strength and the reference value to the signal processing unit 10 (CPU block 10f). The "standard value" will be described in detail later.

Figure 4:
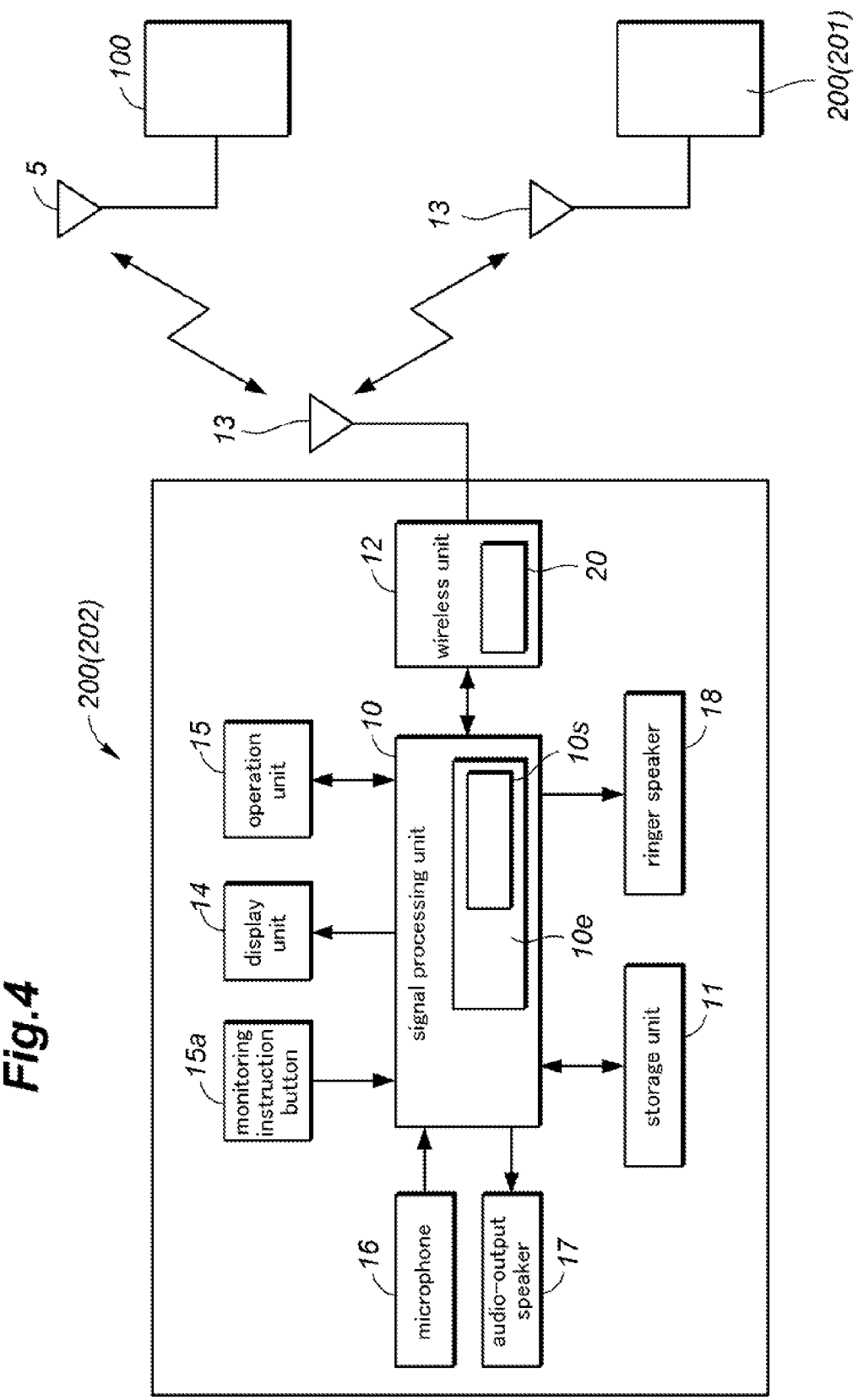
FIG. 4 is a block diagram showing a general structure of the handset of the cordless telephone system.

FIG. 4 is a block diagram showing a general structure of the handset 200 of the cordless telephone system. As described in the foregoing with reference to FIG. 2B, the handset 200 includes a display unit 14 for displaying the telephone number of an incoming call or the telephone number input when the user makes a call, an operation unit 15 for allowing the user to input a telephone number or the like, a monitoring instruction button 15a for allowing the user to instruct start of monitoring, a microphone 16 for capturing the user's voice, an audio-output speaker 17 for outputting the voice of the person on the other end of the line regenerated from the received signal, and a ringer speaker 18. Further, the handset 200 includes a storage unit 11 storing speed dial data, audio guide data, data of alarm sound, voice message or the like to be output from the audio-output speaker 17 when an abnormality is detected, an antenna 13 for transmitting and receiving radio waves to and from the base unit 100 or another handset 200 (the second handset 202 for the first handset 201 and the first handset 201 for the second handset 202), a signal processing unit 10, and a wireless unit 12.

The handset 200 is generally designed to be compact in size so as to be portable, but the basic functions thereof are substantially the same as those of the base unit 100 described above with reference to FIG. 3. Namely, the structure and function of the signal processing unit 10 and the wireless unit 12 of the handset 200 are substantially the same as those of the signal processing unit 10 and the wireless unit 12 of the base unit 100 described above. (for this reason, the same reference numerals are used). Therefore, detailed description of these component parts of the handset 200 will be omitted.

It is to be noted, however, that the frame processing unit 10e of the signal processing unit 10 in the handset 200 is provided with a synchronization control unit 10s. The synchronization control unit 10s functions to match the reception timing of the handset 200 with the transmission timing of the base unit 100. Specifically, when one handset 200 is turned on, for example, the handset 200 autonomously performs reception operation periodically at a predetermined reception timing, and during such operation, when the synchronization control unit 10s receives from the base unit 100 a synchronization request that includes data representing a difference between the timing at which the synchronization request is transmitted and the timing with which the reception timing in the handset 200 should be synchronized, the synchronization control unit 10s adjusts the reception timing so as to eliminate the difference, and the frame processing unit 10e controls the hardware relating to signal processing in accordance with the adjusted reception timing. Thereby, the reception timing of each handset 200 can be adjusted to coincide with the transmission timing (or time slot for transmission in each frame) used by the base unit 100 in transmission designating the handset 200.

Further, the wireless unit 12 of the handset 200 is provided with the aforementioned radio wave strength measurement unit 20. As in the base unit 100, in the handset 200 also, the signal processing unit 10 sets in the radio wave strength measurement unit 20 a reference value ("standard value") for assessing the measured radio wave strength, and the wireless unit 12 outputs a difference between a measured value of the radio wave strength and the reference value to the signal processing unit 10.

Figure 5:
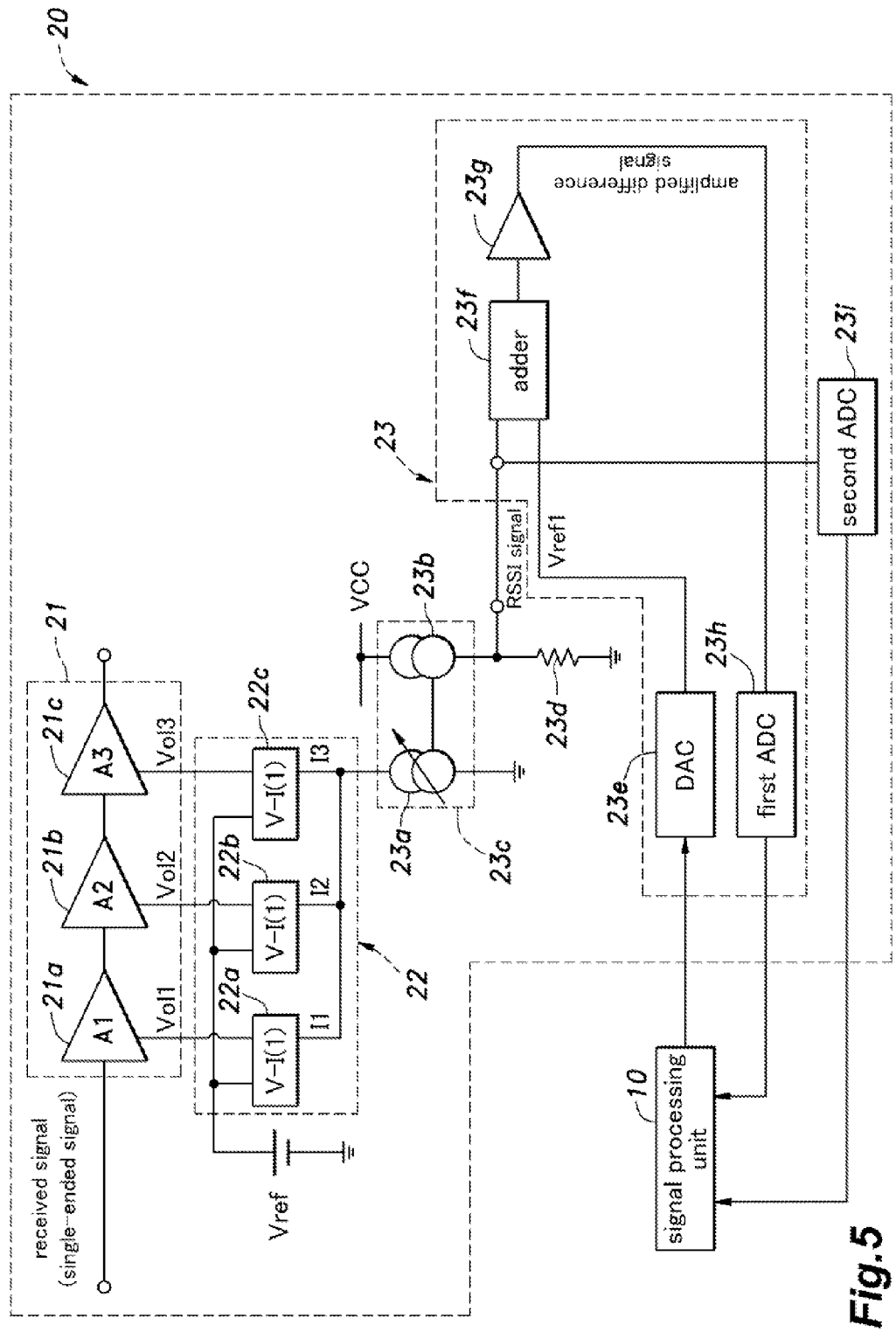
FIG. 5 is a diagram showing a structure of a radio wave strength measurement unit.

FIG. 5 is a diagram showing a structure of the radio wave strength measurement unit 20. As shown in FIG. 5, the radio wave strength measurement unit 20 in the first embodiment includes a limiter amplifier unit 21, a V-I conversion unit 22 and a difference signal generation unit 23.

The limiter amplifier unit 21 is formed of three stage limiter amplifiers 21a, 21b and 21c that perform amplitude limitation and rectification. The received signal (e.g., a single-ended signal after demodulation) input to the limiter amplifier 21a is amplified in stages by the limiter amplifiers 21a, 21b and 21c. Then, rectified voltage signals Vo1, Vo2 and Vo3 output from the limiter amplifiers 21a, 21b and 21c, respectively, are converted into current signals I1, I2 and I3 by V-I converters 22a, 22b and 22c corresponding to the respective rectified voltage signals and constituting the V-I conversion unit 22.

A total current signal obtained by adding up the current signals I1, I2 and I3 is converted into an analog voltage signal by a first current source 23a, a second current source 23b that forms a current mirror circuit 23c jointly with the first current source 23a, and a resistor 23d connected to the second current source 23b, whereby a reception power RSSI signal (hereinafter simply referred to as "RSSI signal") is obtained.

An "RSSI (Received Signal Strength Indicator)" may refer to a circuit for measuring the strength of a signal received by a wireless communication device of a cordless telephone system or the like or a measurement of the power of the received signal, and is used herein as an indicator representing the strength of the received radio waves. In this description, the RSSI signal represents an amount of power in decibels referenced to 1 (one) mW (i.e., 1 mW=0 dB), whose abbreviation generally is dBm.

The difference signal generation unit 23 includes a DA converter 23e, an adder 23f, an amplifier 23g and a first AD converter 23h. The aforementioned RSSI signal is input into the adder 23f. On the other hand, standard data (digital value representing a later-described "standard value") is input into the DA converter 23e from the signal processing unit 10. The DA converter 23e convers the input standard data into an analog signal and inverts the polarity of this analog signal to generate a Vref1 signal, which is input into the adder 23f. Thereby, a difference signal obtained by subtracting the standard value from the RSSI signal is generated.

The difference signal output from the adder 23f is amplified by the amplifier 23g, and the amplified difference signal is input into the first AD converter 23h. The first AD converter 23h quantizes the input amplified difference signal with an accuracy on the order of 10 to 12 bits, for example, thereby obtaining a digital difference signal. The digital difference signal is input into the signal processing unit 10. Then, the CPU block 10f of the signal processing unit 10 determines whether an abnormality is detected. It is to be noted that, instead of amplifying the difference signal by the amplifier 23g, it is possible to full-wave rectify the difference signal to obtain an absolute value of the RSSI signal shown in FIG. 6B, for example, and integrate the absolute value so that the determination of whether an abnormality is detected may be performed based on the integrated absolute value.

The radio wave strength measurement unit 20 further includes a second AD converter 23i. The aforementioned RSSI signal is also input to this second AD converter 23i, which quantizes the input RSSI signal to about 10 to 16 bits, for example, and outputs a digital RSSI signal. The digital RSSI signal is input into the signal processing unit 10, and a representation of the radio wave strength is displayed on the display unit 6 of the base unit 100 and/or the display unit 14 of the handset 200. Further, the digital RSSI signal is processed by the signal processing unit 10 to produce the aforementioned standard value.

Figure 6:
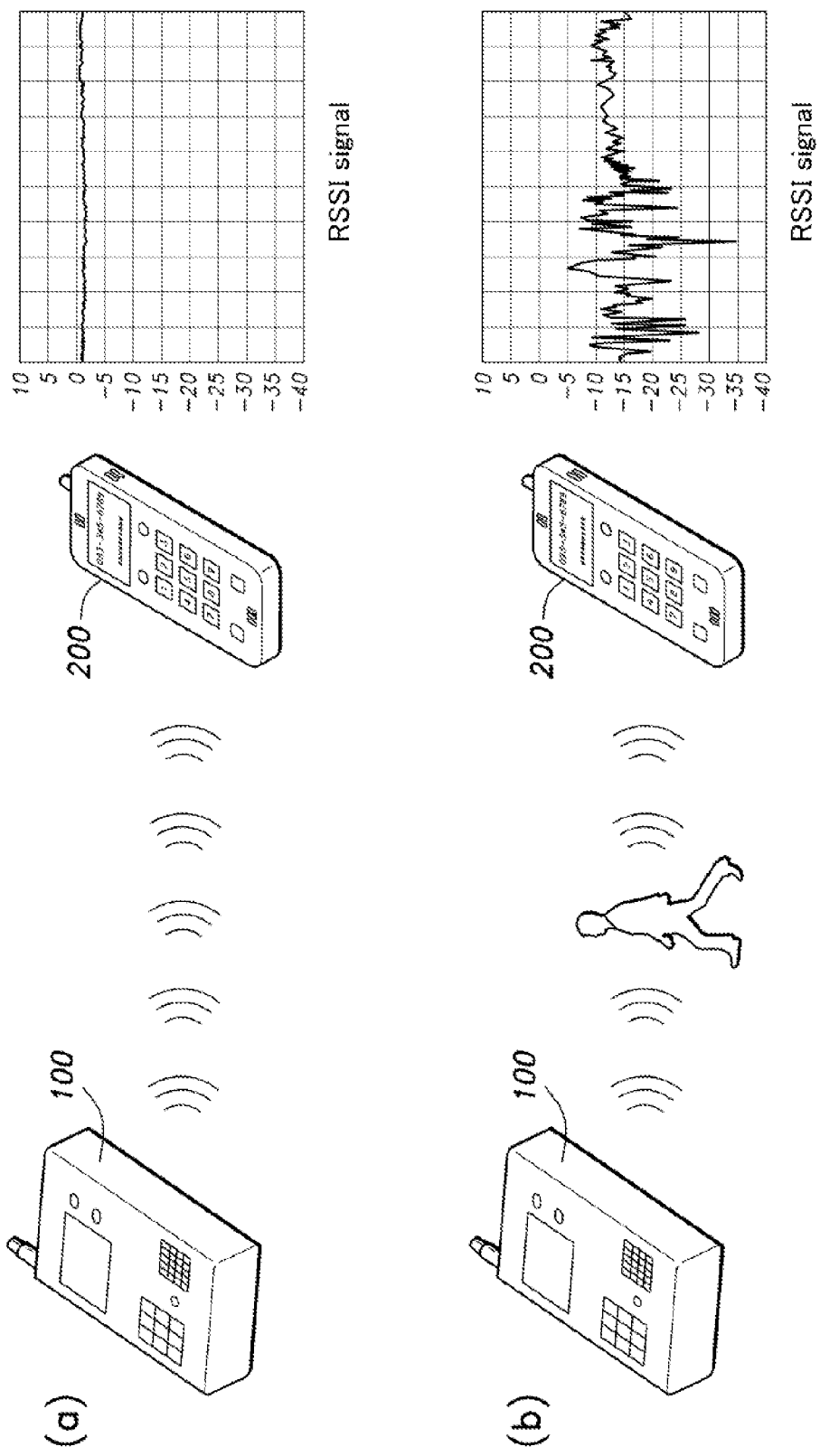
FIG. 6A is an explanatory diagram showing an RSSI signal measured by the radio wave strength measurement unit of one handset when there is no person in a space between the base unit and the handset.
FIG. 6B is an explanatory diagram showing an RSSI signal measured by the radio wave strength measurement unit of one handset when there is a person in the space between the base unit and the handset.

FIG. 6A is an explanatory diagram showing an RSSI signal measured by the radio wave strength measurement unit 20 of one handset 200 (first handset 201 or second handset 202) when there is no person in a space between the base unit 100 and the handset 200, and FIG. 6B is an explanatory diagram showing an RSSI signal measured by the radio wave strength measurement unit 20 of one handset 200 when there is a person in the space between the base unit 100 and the handset 200. Further, FIG. 7 is an explanatory diagram showing an RSSI signal measured by the radio wave strength measurement unit 20 of one of the first handset 201 and the second handset 202 when there is a person in a space between the first handset 201 and the second handset 202. In the graphs shown in FIGS. 6A, 6B and 7, each grid line on the horizontal axis represents one second, and the vertical axis represents the signal strength [dBm].

In the following, description will be made of the principle of the monitoring technique adopted in the cordless telephone system of the first embodiment. In the following description, a state in which there is no person in the space between the base unit 100 and the handset 200 as shown in FIG. 6A will be referred to as "a normal state." On the other hand, a state in which there is a person in the space between the base unit 100 and the handset 200 as shown in FIG. 6B and a state in which there is a person in the space between the first handset 201 and the second handset 202 as shown in FIG. 7 each correspond to the aforementioned "abnormal state."

As shown in FIG. 6A, when the base unit 100 and one handset 200 are communicating with each other in the normal state, with the base unit 100 serving as a transmitting unit and the handset 200 serving as a receiving unit, the RSSI signal measured by the handset 200 maintains a substantially constant value. However, as shown in FIG. 6B, in the abnormal state, the signal level of the RSSI signal measured by the handset 200 fluctuates. Also, as shown in FIG. 7, when the first handset 201 and the second handset 202 are communicating with each other in the abnormal state, with the first handset 201 serving as a transmitting unit and the second handset 202 serving as a receiving unit, the signal level of the RSSI signal measured by the second handset 202 fluctuates.

It is considered that entering (more precisely, moving) of a human body (dielectric) in the space between the base unit 100 and the handset 200 (or between the first handset 201 and the second handset 202) causes the propagation routes of the radio waves to vary, such that the radio waves propagating through varied routes interfere with each other and hence strengthen or weaken each other, thereby causing the fluctuations in the RSSI signal. Thus, in the cordless telephone system of the first embodiment, the presence/absence of motion of a human body in the space between the base unit 100 and the handset 200 is detected.

Figure 8:
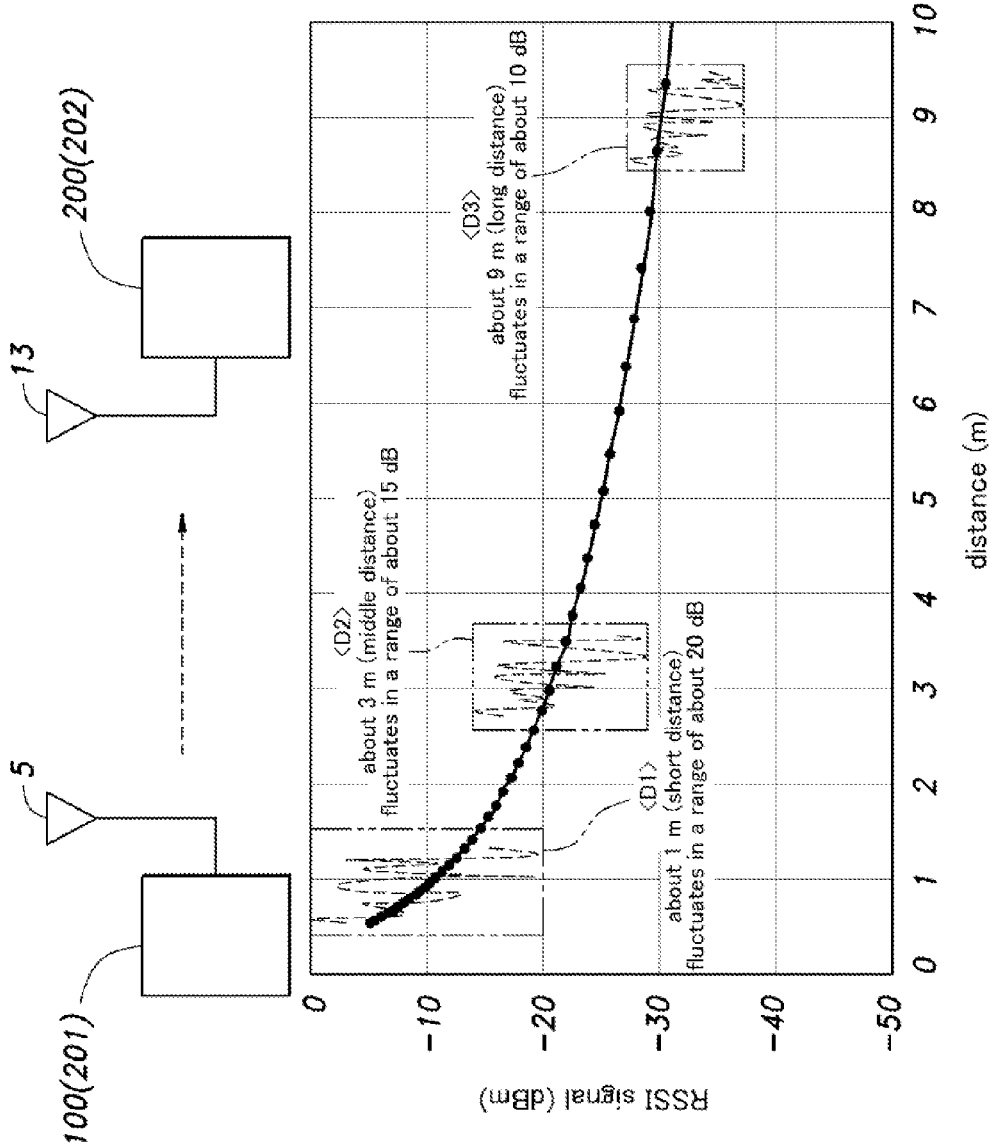
FIG. 8 is a graph showing a relationship between the RSSI signal obtained by one handset and the distance between the base unit and the handset.

FIG. 8 is a graph showing a relationship between the RSSI signal obtained by one handset 200 and the distance between the base unit 100 and the handset 200. A solid line in the graph of FIG. 8 is obtained by plotting the RSSI signal output from the radio wave strength measurement unit 20 of the handset 200 while gradually changing the distance between the base unit 100 and the handset 200 in a state where the base unit 100 transmits radio waves from the antenna 5 (thus, serving as a transmitting unit) and the handset 200 receives the radio waves by means of the antenna 13 (thus, serving as a receiving unit) in the normal state. On the other hand, broken lines in FIG. 8 represent temporal changes in the RSSI signal measured by the handset 200 at some distances from the base unit 100 in the abnormal state. In the graph shown in FIG. 8, each grid line on the horizontal axis represents one meter, and the vertical axis represents the signal strength of the RSSI signal [dBm].

As shown in FIG. 8, as the distance between the base unit 10 and the handset 200 increases, the RSSI signal measured in the normal state decreases. Provided that the power emitted from the antenna 5 of the base unit 100 is represented by P, the RSSI signal (reception power) by Pr, the distance between the base unit 100 (transmitting side) and the handset 200 (receiving side) by r, and the effective opening area of the receiving side antenna 13 by Ae, there is a following relationship between them:

$$Pr = P/4\pi r^2 \cdot Ae \quad \text{(Equation 1)}$$

Namely, the reception power Pr is equal to the radio wave density, $P/4\pi r^2$, multiplied by the effective opening area Ae, and thus, is inversely proportional to the square of the distance.

Concretely, as shown by the solid line in FIG. 8, the RSSI signal has a value on the order of −10 dBm when the base unit 100 and the handset 200 are apart from each other by a distance D1 (a short distance on the order of 1 m), a value on the order of −20 dBm when the base unit 100 and the handset 200 are apart from each other by a distance D2 (a middle distance on the order of 3 m), and a value on the order of −30 dBm when the base unit 100 and the handset 200 are apart from each other by a distance D3 (a long distance on the order of 9 m).

At each of the distance D1, distance D2 and distance D3, the RSSI signal in the abnormal state fluctuates relative to the output value of the RSSI signal in the normal state. Specifically, the RSSI signal in the abnormal state fluctuates in a range of about 20 dB at the distance D1, in a range of about 15 dB at the distance D2, and in a range of about 10 dB at the distance D3. The aforementioned radio wave strength measurement unit 20 measures this fluctuation, which is output after being amplified by the difference signal generation unit 23. It is to be noted that, if the base unit 100 is replaced with the first handset 201 and the handset 200 is embodied by the second handset 202 (namely, in a case where communication is performed between the handsets), the characteristics of the received radio wave strength show substantially the same trend as that shown in FIG. 8.

Figure 9:
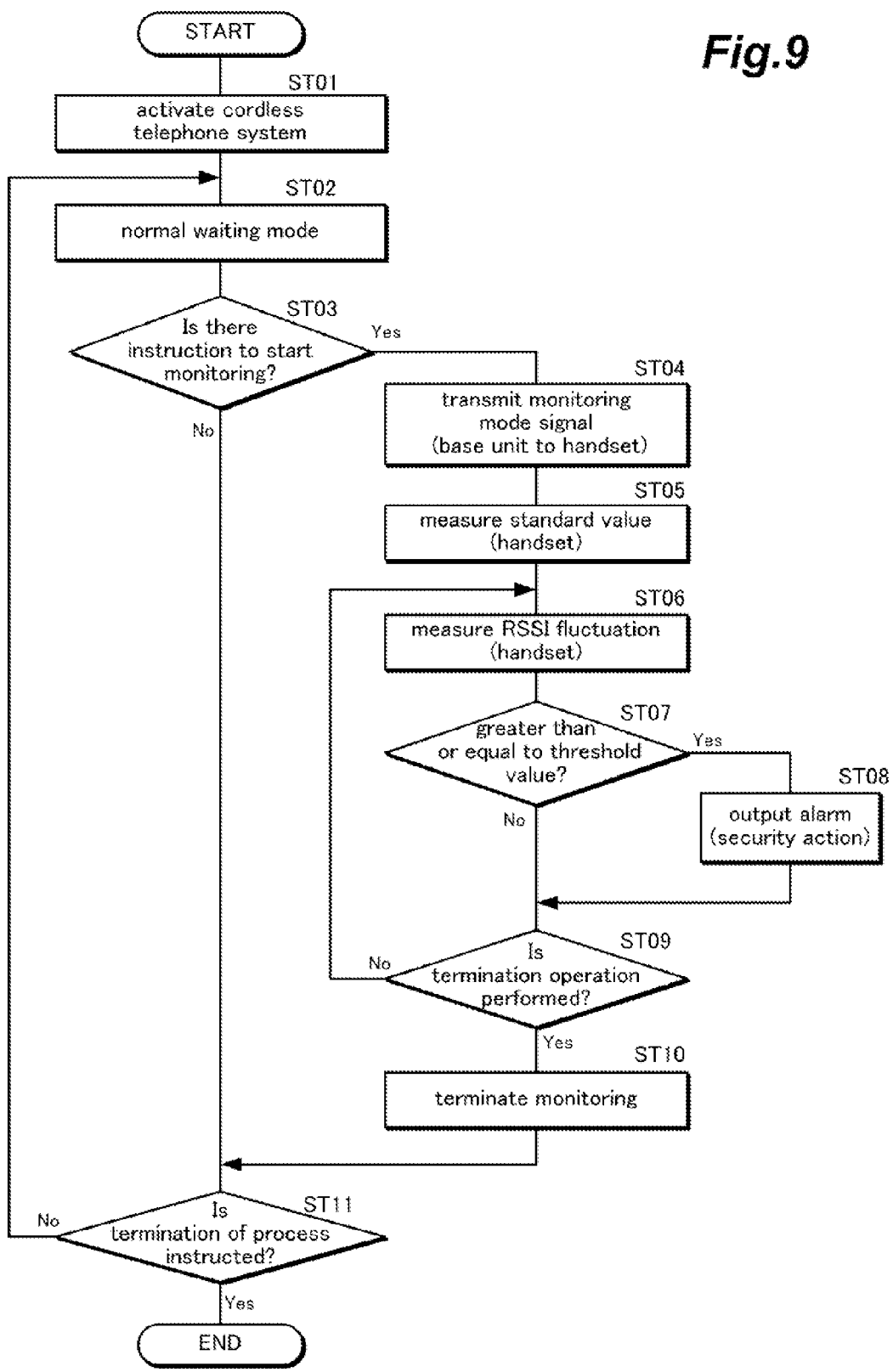
FIG. 9 is a flowchart showing a flow of a process relating to a security action.

FIG. 9 is a flowchart showing a flow of a process relating to a security action. In the cordless telephone system according to the first embodiment, a prescribed security action is performed upon detection of an abnormality. In the following, with reference to FIG. 9 together with FIGS. 2, 4 and 5, description will be made of a process relating to the security action. It is to be noted that the following description with reference to FIG. 9 will be made of one handset 200 since each handset 200 operates in the same manner.

Upon activation of the cordless telephone system (i.e., when the base unit 100 and the handset 200 are turned on), the signal processing unit 10 of each of the base unit 100 and the handset 200 executes an initialization process (ST01), and then each of the base unit 100 and the handset 200 enters a normal standby mode (ST02). During the initialization process, the handset 200 adjusts its reception timing to be in synchronization with a control slot (described in detail later), namely, a time period in each frame in which control data is transmitted from the base unit 100.

In the normal standby mode, the signal processing unit 10 (CPU block 10f) of the base unit 100 detects whether the monitoring instruction button 7a is pressed and determines whether the start of monitoring is instructed (ST03). If the user presses the monitoring instruction button 7a of the base unit 100, the signal processing unit 10 determines that the start of monitoring is instructed (Yes in step ST03), and accordingly monitoring is started.

It is to be noted that, in the following description, if not mentioned otherwise, the signal processing unit 10, wireless unit 12, and radio wave strength measurement unit 20 will be those of the handset 200. When description is made of the signal processing unit 10, etc. of the base unit 100, it will be mentioned by using such expression as "the signal processing unit 10 of the base unit 100." At the start of monitoring, the base unit 100 sends a "command instructing the execution of monitoring" (hereinafter referred to as a "monitoring mode signal") to the handset 200 using the control slot (described later) (ST04). The wireless unit 12 receives the "monitoring mode signal" and then notifies the signal processing unit 10 that the monitoring mode signal is received. Upon receipt of the notification, the signal processing unit 10 acquires a digital RSSI signal from the second AD converter 23i in the radio wave strength measurement unit 20 provided to the wireless unit 12, and begins calculation of the aforementioned "standard value" (ST05).

As described in the foregoing, the digital RSSI signal output from the second AD converter 23i is a numerical value directly indicating the radio wave strength. As also described with reference to FIG. 8, the strength (reception power) of the RSSI signal changes depending on the positional relationship between the base unit 100 and the handset 200. When the cordless telephone system is installed in an ordinary house, it is typical that the base unit 100 is placed at a fixed location while the handset 200 is used at various locations. Thus, in a case where the handset 200 is used for the purpose of performing monitoring at a house, the handset 200 may be moved to various places such as near a window, for example. Consequently, in a case where the monitoring is performed based on the strength of the radio waves used in communication between the base unit 100 and the handset 200 as in the first embodiment, the place to be monitored may not be fixed. Therefore, it is preferred that every time the monitoring is started upon pressing of the monitoring instruction button 7a of the base unit 100, the "standard value" used as a reference for assessing the change in the RSSI signal be obtained anew (calibrated).

It is to be noted, however, that when the monitoring instruction button 7a of the base unit 100 is pressed and the aforementioned "monitoring mode signal" is received by the handset 200, the handset 200 does not immediately start obtaining of the "standard value." This is because it is often the case that a resident is still present in the house immediately after the monitoring instruction button 7a of the base unit 100 is pressed, and the "standard value" obtained with a resident(s) present in the house is likely to have an error.

In the following, description will be made of a process for detecting absence of a person. When the "monitoring mode signal" is received by the handset 200, the signal processing unit 10 of the handset 200 starts monitoring the digital RSSI signal at a predetermined interval such as 1 (one) sec. Each time a predetermined number of values of the digital RSSI signal are obtained, the signal processing unit 10 computes the variance ($\delta^2$) of these values of the digital RSSI signal, and when the variance becomes below or equal to a predetermined value, the signal processing unit 10 executes a process of obtaining the "standard value." Thus, in this case, the variance of the predetermined number of values of the digital RSSI signal below or equal to a predetermined value indicates absence of a person in the house. It is to be noted that the timing of obtaining the "standard value" may be determined without use of the variance. For example, it is possible to start a timer when the "monitoring mode signal" is first received by the handset 200 and to obtain the "standard value" when the timer indicates that a predetermined time period has lapsed.

Further, since the cordless telephone system is connected with the telephone line via the base unit 100, the user may send a predetermined command(s) to the base unit 100 from a remote location. When the start of monitoring is instructed to the base unit 100 with a command sent from a remote location via the telephone line, the base unit 100 operates to start monitoring by transmitting the "monitoring mode signal" to the handset 200 according to the above described procedure. It is to be noted, however, when the monitoring is started upon receipt of a command from a remote location, the handset 200 may start obtaining the "standard value" immediately without waiting for detection of absence of a person in the house.

During a process of obtaining the "standard value," the signal processing unit 10 may set the monitoring interval of the digital RSSI signal at a relatively short interval (for example, 200 ms) to obtain the "standard value" in a short period of time, and apply a median filter to a predetermined number (odd number, such as seven) of digital RSSI signals, to obtain a center value of these digital RSSI signals. A median filter may be used in the field of image processing to remove falling snow from images, for example, and can remove impulse-like events that occur along the time axis (namely, is effective in generating a reference for background subtraction).

The use of the median filter makes it possible to remove impulse noise that may be caused by a curtain swayed by the wind, for example. The signal processing unit 10 may average multiple outputs from the median filter to obtain the "standard value." This process of averaging may obtain a moving average and may be executed continuously over time (namely, the "standard value" changes over time).

When the "standard value" is computed as described in the foregoing, the signal processing unit 10 sets in the DA converter 23e the "standard value" as the aforementioned reference data, and the DA converter 23e generates the voltage corresponding to the "standard value," inverts the polarity of the voltage and outputs the polarity-inverted voltage as Vref1. As a result, the signal processing unit 10 produces a digital difference signal obtained by digitizing the difference between the RSSI signal and Vref1 (each being an analog signal) every predetermined sampling period (10 ms, for example). Then, the signal processing unit 10 processes the digital difference signal to assess the fluctuation of the RSSI signal (ST06). As can be appreciated from the foregoing description, the process of obtaining the fluctuation of the RSSI signal is executed based on an idea similar to that adopted in "background subtraction" which is used to detect changes in images in the field of image processing. It is to be noted that the "standard value" represents the RSSI signal in the normal state, and during the monitoring, it is possible to monitor the output from the second AD converter 23i by the signal processing unit 10 and to calculate the difference between the result of the monitoring and the "standard value" successively as a software process, instead of using the hardware such as the adder 23f and the amplifier 23g described above.

The digital difference signal may be positive or negative, and therefore, the signal processing unit 10 obtains the absolute value of the digital difference signal at a predetermined interval and calculates an average of a predetermined number of absolute values of the digital difference signal obtained consecutively. The average may be calculated as a simple average calculated each time a new set of predetermined number of absolute values of the digital difference signal is obtained. Alternatively, the average may be a moving average, in which an average is calculated for a predetermined number of latest absolute values of the digital difference signal each time a new absolute value of the digital difference signal is obtained, by replacing the oldest one of the predetermined number of absolute values of the digital difference signal with the new one. The time period over which an average of the absolute values of the digital difference signal is calculated may be set at 0.5 to 3 sec, for example.

Next, the signal processing unit 10 compares the average of the absolute values of the digital difference signal with a predetermined threshold value (ST07). There is a tendency that, as the distance between the base unit 100 and the handset 200 becomes larger, the absolute value of the RSSI signal reduces and the fluctuation range of the RSSI signal also becomes smaller (see FIG. 8). Therefore, it is preferred that the threshold value for assessing the fluctuation range be variable depending on the distance between the base unit 100 and the handset 200. Since the "standard value," which directly reflects the value of the RSSI signal, may be considered substantially indicating the distance between the base unit 100 and the handset 200, in the first embodiment, the threshold value is varied depending on the "standard value." Specifically, the threshold value is set to a relatively large value when the "standard value" indicates a short distance, and to a relatively small value when the "standard value" indicates a long distance. Further, it is also possible, for example, that the threshold value when the "standard value" indicates a short distance be variable in multiple steps (e.g., three steps), such that the user can change the abnormality detection sensitivity in the monitoring from high to low in multiple steps by varying the threshold value in steps. This designation of sensitivity may be performed by use of the operation unit 7 (see FIG. 2) of the base unit 100, for example.

In a case where the average of the absolute values of the digital difference signal is greater than or equal to the predetermined threshold value (Yes in step ST07), the handset 200 determines that there is an abnormal state and starts a security action. As the security action, for example, the handset 200 outputs a predetermined alarm sound such as a ringing sound to thereby perform alarming with sound (ST08). More specifically, the handset 200 converts the audio data pre-stored in the storage unit 11 into an audio signal by use of the signal processing unit 10, and outputs the audio signal through the ringer speaker 18. The audio data may be the one corresponding to a simple ringing sound, for example, or the one corresponding to a predetermined message such as "A suspicious person is detected."

On the other hand, in a case where the average of the absolute values of the digital difference signal is less than the predetermined threshold value (No in step ST07), the process moves to step ST09, where it is determined whether the termination of monitoring is instructed, as described later. It is to be noted that the security action may be halted before the process moves to step ST09 when the determination result in step ST07 is No. Alternatively, it is possible to count the number of consecutive times that the result of determination in step ST07 is No, and to halt the security action when the counted number reaches a predetermined number. It is also possible to halt the security action only when it is determined in step ST09 that termination of monitoring is instructed (Yes in step ST09).

The security action does not have to be limited to outputting of a ringing sound or a voice message, and may include other processes. For example, the security action may include a process of calling one or more telephone numbers pre-stored in the storage unit 11 of the handset 200, where the pre-stored telephone numbers may include that of a security company, for example. And when there is an answer to the phone call, the audio-output speaker 17 and the microphone 16 of the handset 200 (see FIG. 4) may be activated to allow the handset to function as a so-called speaker phone, so that the person on the other end of the line (e.g., a security company staff member) can hear the sound generated around the handset 200, which may help the person understand the situation. Further, it is possible to first emit an alarm such as a ringing sound upon detection of an abnormality, and when the abnormality continues to be detected for a predetermined time period thereafter, to make a notification to the security company; namely, the security action may be performed in multiple stages. Thereby, in a case such as when a family member returns home, it is possible to avoid making an unnecessary notification to the security company or the like.

Further, the security action may include a process of making notification via wireless channel. The "notification via wireless channel" here is, for example, notification from the handset 200 to the base unit 100 or notification from one handset to another. When the base unit 100 is notified from the handset 200 that an abnormal state is detected, the base unit 100 itself may perform the security action described above. The security action is only required to include at least one of the various processes described above and may include two or more of these processes in combination.

It is to be noted that, instead of determining by the handset 200 whether there is an abnormality based on the measured RSSI signal (more precisely, digital amplified difference signal), the handset 200 may transmit to the base unit 100 the values of the digital difference signal described above, or alternatively, the values of the digital RSSI signal and the "standard value" in response to the control data transmitted from the base unit 100 in the control slot, so that the determination whether there is an abnormality based on the RSSI signal (or digital amplified difference signal) measured by the handset 200 is performed by the base unit 100.

Subsequently, the signal processing unit 10 determines whether a termination operation is performed (ST09). When the signal processing unit 10 of the base unit 100 detects pressing of the monitoring instruction button 7a while the monitoring is being performed, the signal processing unit 10 of the base unit 100 determines that an instruction to terminate the monitoring is input. Upon such detection, the signal processing unit 10 of the base unit 100 terminates the transmission of the "monitoring mode signal" (though the transmission of the control data in the periodically occurring control slot is not terminated, the "monitoring mode signal" is deleted from the control data), and this allows the signal processing unit 10 of the handset 200 to recognize that the monitoring termination operation (pressing of the monitoring instruction button 7a) is performed. Upon recognition of performance of the operation instructing the termination of monitoring (Yes in step ST09), the handset 200 stops the aforementioned assessment of the digital difference signal and terminates the monitoring (ST10).

On the other hand, when the handset 200 does not recognize performance of the operation instructing the termination of monitoring (No in step ST09), the process goes to step ST06 and the above-described monitoring is continued.

After the termination of the monitoring (ST10), the signal processing unit 10 determines whether instruction of terminating the process is input by detecting turning off of the power switch of the handset 200, for example (ST11). If the turning off of the power switch is detected (Yes in step ST11), the handset 200 terminates the program, and if not (No in step ST 11), the process returns to step ST02.

Figure 10:
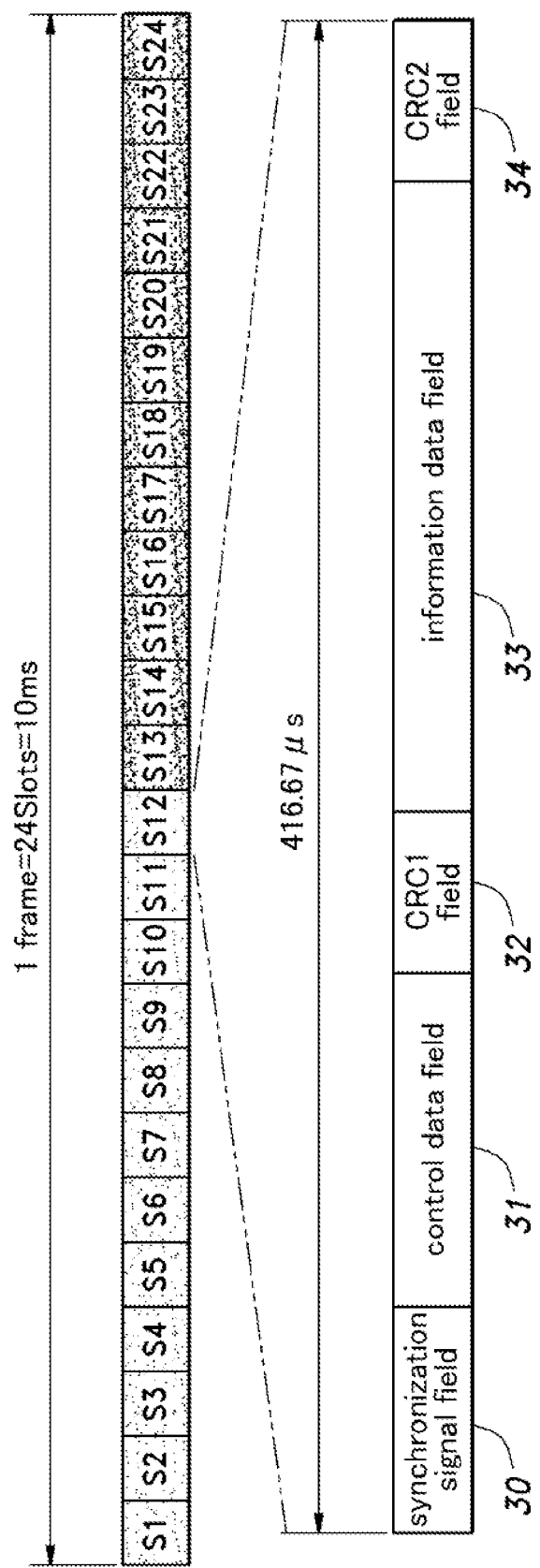
FIG. 10 is an explanatory diagram for explaining the frame structure of DECT.

FIG. 10 is an explanatory diagram for explaining the frame structure of DECT. In DECT, each frame is 10 ms in duration and includes twenty-four slots (twelve slots for up-link and twelve slots for down-link). Typically, slot 1 (S1) to slot 12 (S12) are used for the communication from the base unit 100 to the handsets 200, and slot 13 (S13) to slot 24 (S24) are used for the communication from the handsets 200 to the base unit 100. In the communication between the base unit 100 and the handsets 200, a pair of slots (slot pair) separated from each other by 5 ms, such as slot 1 (S1) and slot 13 (S13) or slot 2 (S2) and slot 14 (S14), are used as a single communication channel.

Of the twelve slots used for transmission from the base unit 100 to the handsets 200, at least one slot (e.g., slot 1 (S1)) is used as a control slot for transmitting control data. The control data is transmitted from the base unit 100 periodically using one slot in each frame while the base unit 100 is on. It is to be noted that radio wave interference may occur during transmission of control data from the base unit 100 to a certain handset 200, disabling the control slot therefor (e.g., slot 1 (S1)). In preparation for such an event, it is possible to monitor the status of idol slots (for example, when slot 1 (S1) is used as the control slot, slot 2 (S2) to slot 12 (S12)) to detect whether the idol slots are used by other units, such that when radio wave interference or the like actually occurs and slot 1 (S1) becomes unable to be used, a slot not in use (e.g., slot 2 (S2)) may be used as the control slot in place of slot 1 (S1). When the slot used as the control slot is changed from slot 1 (S1) to slot 2 (S2), the response slot corresponding to the control slot (a slot used for response to the control slot; namely, used in data transmission from the handset 200 to the base unit 100) is changed from slot 13 (S13) to slot 14 (S14). Thus, the slot used as the control slot can be variably determined depending on the circumstances.

Each slot has a width (duration) of 416.67 μs (=10 ms/24), and includes a synchronization signal field 30, a control data field 31, a CRC1 field 32, an information data field 33 and a CRC2 field 34 defined therein.

The synchronization signal field 30 contains fixed data constituted of a data string for achieving bit synchronization and a data string for achieving slot synchronization. The CRC1 field 32 is a field in which a CRC (Cyclic Redundancy Check) code calculated based on a data string in the control data field 31 is written to detect a transmission error in the control data field 31. Similarly, the CRC2 field 34 contains a CRC code for detecting a transmission error in the information data field 33. When an error is detected owing to the CRC, the handset 200 may request the base unit 100 to retransmit the data.

The control data field 31 (may be referred to as an A-field) is a field for transmitting, from the base unit 100 to the handsets 200, the control data necessary when making a phone call, when receiving an incoming call, while in the standby mode, etc. Specifically, the control data may include identification information (so-called ID) of the handset(s) 200 to which the control data is directed, data indicating the device performance, data indicating communication quality, data indicating presence of an incoming call, data indicating disconnection, data for retransmission control when a transmission error is detected, and so on. Further, the control data includes the aforementioned "monitoring mode signal." Therefore, by referring to the control data field 31 of the data received in the control slot, each handset 200 can acquire the control data and determine whether the execution of monitoring is instructed. It is to be noted that the handset 200 may make data indicating the status or the like of the handset 200 (for example, the value of the digital RSSI signal described above) be contained in the control data field 31 in the response slot that forms a pair with the control slot, such that the data contained in the control data field 31 is transmitted to the base unit 100 in the response slot.

On the other hand, the information data field 33 (may be referred to as a B-field) is a field for containing a packet of audio data, image data or the like.

When audio data is communicated between the base unit 100 and any of the handsets 200, the audio data is written in the information data field 33. However, in the control slot, only the synchronization signal field 30, control data field 31 and CRC1 field 32 are effective and the information data field 33 and the CRC2 field 34 are not used. In other words, even when the cordless telephone system has no incoming call (or when the system is in the standby mode), the base unit 100 transmits control data to each handset 200 in the control slot allocated thereto in each frame period, and the handset 200 receives the control data. Further, the handset 200 transmits data, as necessary, to the base unit 100 using the response slot corresponding to the control slot. By using this structure, the handset 200 can transmit the data used for abnormality detection described above (e.g., the amplified difference signal) to the base unit 100.

Figure 11:
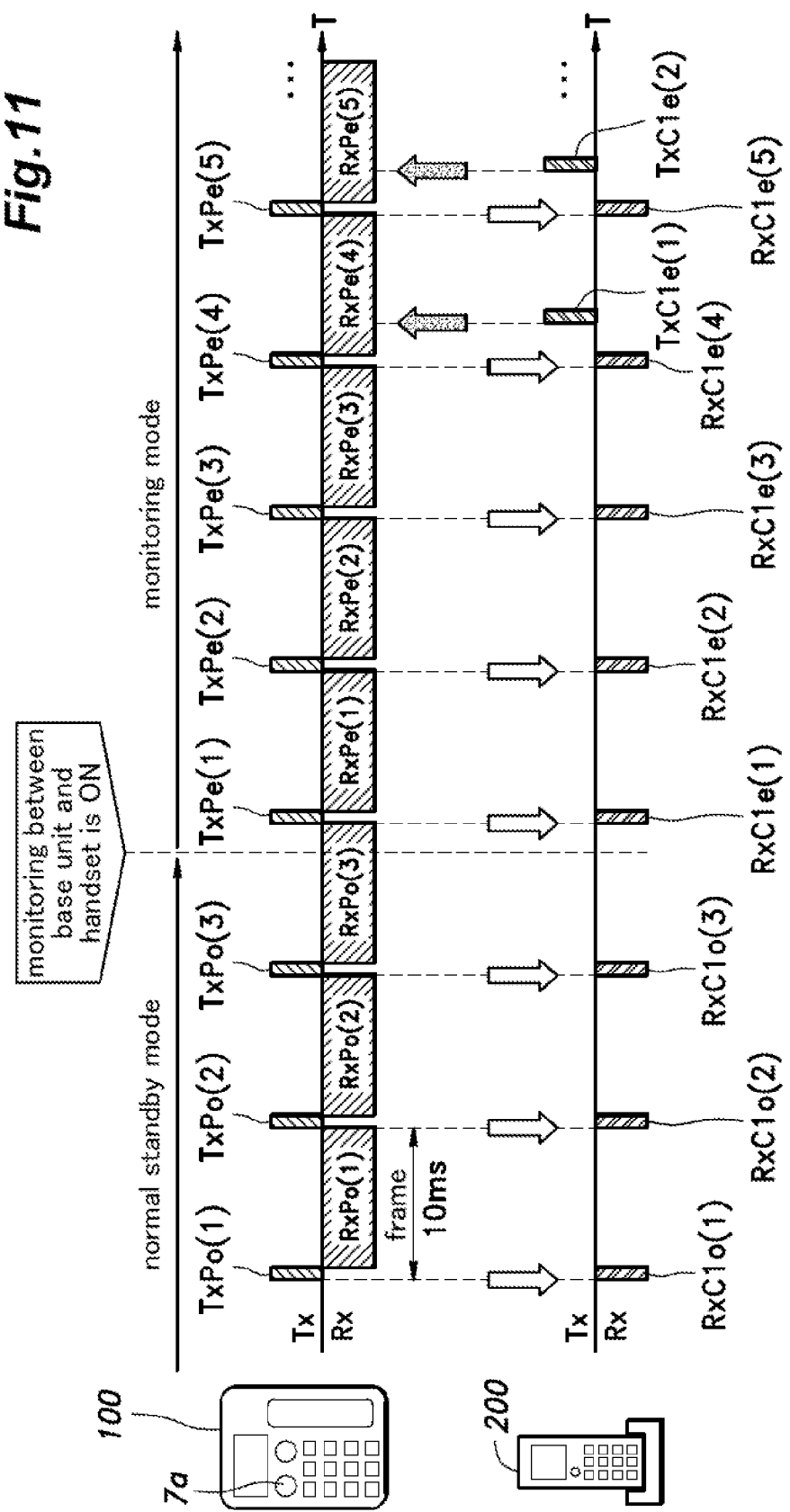
FIG. 11 is an explanatory diagram showing a mode of use of the slots used by the base unit and one handset during execution of a process relating to the security action in the cordless telephone system according to the first embodiment.

FIG. 11 is an explanatory diagram showing a mode of use of the slots used by the base unit 100 and one handset 200 during execution of a process relating to the security action in the cordless telephone system according to the first embodiment. In FIG. 11, initially the base unit 100 and the handset 200 are in the normal standby mode, and the monitoring instruction button 7a of the base unit 100 is pressed at the timing of "monitoring between base unit and handset is ON" to start the monitoring. It is to be noted that, upon start of the monitoring between the base unit 100 and the handset 200, the process of obtaining the "standard value" is executed as described above with reference to FIG. 9, but this process is not shown in FIG. 11 for the sake of simplicity (this applies to the second and third embodiments also). Further, as was described with reference to FIG. 10, the actual pair slots are separated from each other by 5 ms, but in FIG. 11, the slots are shown in a simplified manner (this applies to the second and later embodiments also).

Prior to the start of the monitoring, the transmission and reception between the base unit 100 and the handset 200 have been synchronized, in which the base unit 100 transmits control data in the control slot defined in each frame (10 ms) as a period TxPo(n) (n=1, 2, 3, . . . ; the same applies to the following description including that of the second and later embodiments), while the handset 200 receives the control data in a period RxC1o(n) which is in synchronization with the period TxPo(n). In this state, the control data does not contain the aforementioned "monitoring mode signal."

Thereafter, when the monitoring instruction button 7a of the base unit 100 is pressed to start the monitoring between the base unit 100 and the handset 200, the base unit 100 transmits the control data containing the "monitoring mode signal" in a period TxPe(n) serving as the control slot, and the handset 200 receives the control data in a period RxC1e(n). Upon receipt of the control data containing the "monitoring mode signal," the handset 200 starts obtaining the digital difference signal and calculating an average of the absolute values of the digital difference signal as described in the foregoing, based on the RSSI signal measured each time the control data is received.

Thus, in the first embodiment, the control slot used to maintain synchronization between the base unit 100 and the handset 200 in the normal state is also used to perform monitoring (namely, for measuring the RSSI signal). Specifically, by simply putting the "monitoring mode signal" in the control data (control data field 31) transmitted from the base unit 100, it is possible to have the handset 200 measure the RSSI signal and perform the monitoring, without need for the base unit 100 to set a special slot dedicated to performing the monitoring.

If, as a result of the monitoring, an abnormality is detected, for example, in a period RxC1e(4), in which the handset 200 receives the control data transmitted from the base unit 100 in a period TxPe(4), the handset 200 performs the security action described above in relation to step ST08 of FIG. 9. Further, the handset 200 transmits response data in a period TxC1e(1), which is a response slot corresponding to the period RxC1e(4) (or TxPe(4)). The response data is received by the base unit 100 in a period RxPe(4) (precisely, it is not that the response data is received throughout the duration of the period RxPe(4) but that the response data is received in the slot delayed from the control slot by 5 ms). The response data also includes the control data field 31, and data indicating the detection of an abnormality is written in this control data field 31 by the handset 200, such that the base unit 100 can recognize, by analyzing the control data field 31, that an abnormality is detected by the handset 200. Upon recognition of detection of an abnormality, the base unit 100 also performs one or more of the processes that may be included in the security action described above.

In the first embodiment, when the control data transmitted from the base unit 100 is received by the handset 200, the handset 200 measures the RSSI signal and determination whether there is abnormality is performed based on the measured RSSI signal. Therefore, in the cordless telephone system according to the first embodiment, it is possible to detect intrusion of a burglar or the like reliably and with a simple structure, without need for a special sensor for human body detection provided to the base unit 100 or the handset 200 constituting the cordless telephone system.

Second Embodiment

In the following, a second embodiment of the present invention will be described with reference to the appended drawings.

In the first embodiment, description was made of a structure in which the control data transmitted from the base unit 100 is received by the handset 200, and an abnormality is detected based on the signal strength (RSSI signal) measured by the handset 200 when the control data is received. In the second embodiment, an abnormality is detected based on the RSSI signal measured by the base unit 100.

Figure 12:
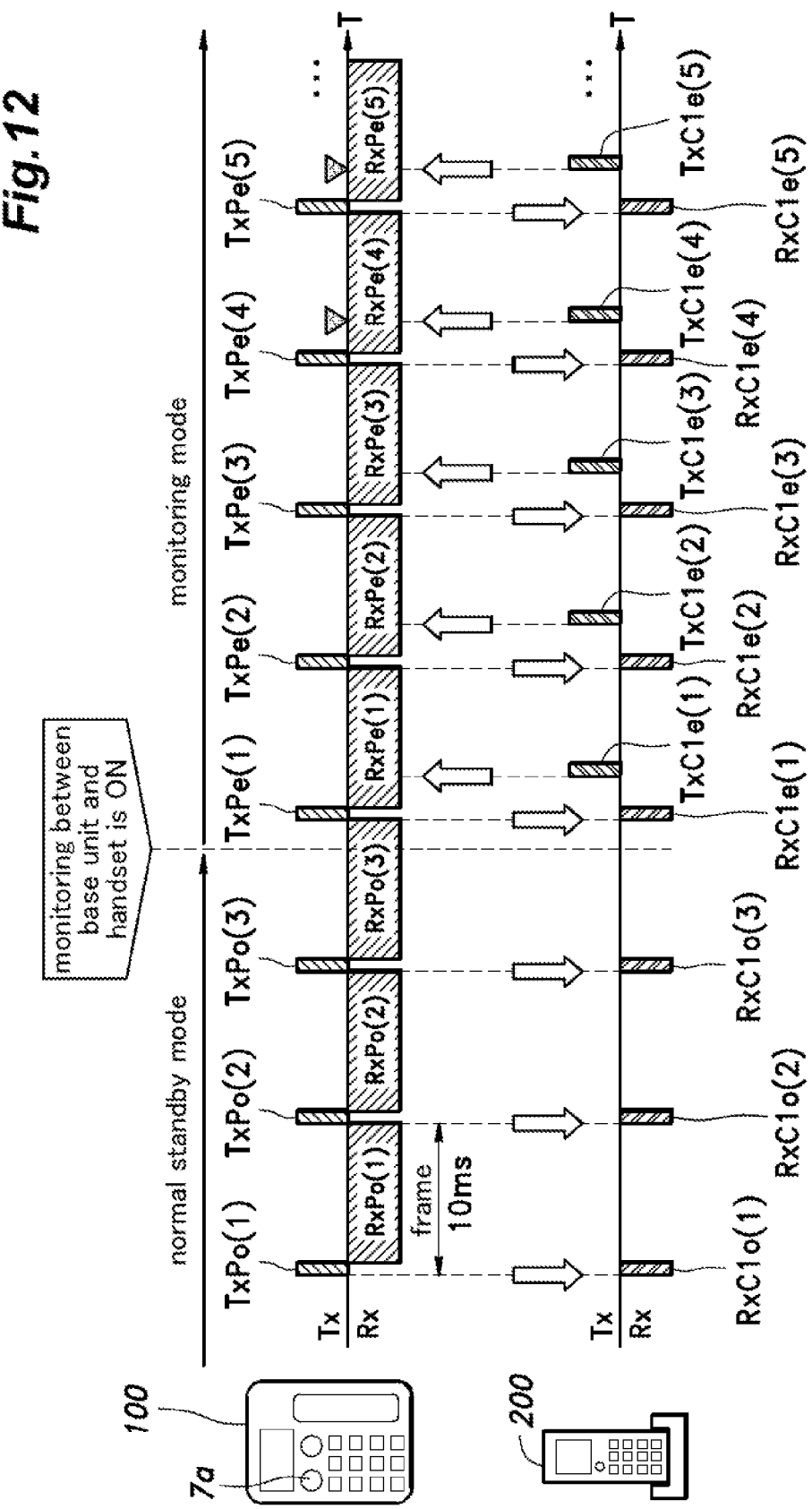
FIG. 12 is an explanatory diagram showing a mode of use of the slots used by the base unit and one handset during execution of a process relating to the security action in the cordless telephone system according to the second embodiment.

FIG. 12 is an explanatory diagram showing a mode of use of the slots used by the base unit 100 and one handset 200 during execution of a process relating to the security action in the cordless telephone system according to the second embodiment. Similarly to the first embodiment, prior to the start of the monitoring, the transmission and reception between the base unit 100 and the handset 200 have been synchronized, and the base unit 100 transmits control data in the control slot defined as the period TxPo(n), while the handset 200 receives the control data in the period RxC1o(n) which is in synchronization with the period TxPo(n). In this state, the control data does not contain the aforementioned "monitoring mode signal."

When the monitoring instruction button 7a of the base unit 100 is pressed, for example, to start the monitoring between the base unit 100 and the handset 200, the base unit 100 transmits the control data containing the "monitoring mode signal" in the period TxPe(n), and the handset 200 receives the control data in the period RxC1e(n). The handset 200 that received the control data containing the "monitoring mode signal" transmits response data to the base unit 100 in a period TxC1e(n), which is a response slot corresponding to the period RxC1e(n).

In the second embodiment, each time the response data (written in the aforementioned control data field 31 (see FIG. 10)) is received by the base unit 100, the radio wave strength measurement unit 20 (see FIG. 3) included in the wireless unit 12 of the base unit 100 measures a digital difference signal based on the radio waves transmitted from the handset 200, and the monitoring is performed based on this digital difference signal. Upon detection of an abnormality, the base unit 100 performs the security action described above. Further, the base unit 100 may instruct the handset 200 to perform the security action, by using the control slot after the detection of an abnormality (for example, a period TxPe(5) in a case where an abnormality is detected during a period RxPe(4) as indicated by a downward triangle in FIG. 12). In response to the instruction, the handset 200 also performs the security action such as outputting of a ringing sound, for example.

It is to be noted that the response data transmitted from the handset 200 to the base unit 100 may include the "monitoring mode signal" in the control data field 31 thereof and the base unit 100 may recognize instruction of the start of the monitoring by analyzing the control data field 31 in the same manner as performed by the handset 200 in the first embodiment, so that the program developed for the handset 200 in the first embodiment can be readily used in the base unit 100 in the second embodiment with small modifications. However, the inclusion of the "monitoring mode signal" in the response data is not essential because the base unit 100 can know that the monitoring should be started from the user's instruction (pressing of the monitoring instruction button 7a). Therefore, the response data may be dummy data.

In the structure according to the second embodiment, the monitoring is performed by the radio wave strength measurement unit 20 provided to the base unit 100 based on the radio waves transmitted from the handset 200. Therefore, in a case where there are multiple handsets 200 used in a house, the monitoring can be performed in a centralized manner based on the response (radio waves) transmitted from each handset 200 in the response slot corresponding to the control slot allocated to each handset 200. Namely, by allocating different pairs of a control slot and a response slot (namely, different communication channels each formed of a control slot and a response slot in each frame) to different handsets 200, the base unit 100 can perform the monitoring by making use of the response from each of the multiple handsets 200.

Further, in the structure of the second embodiment also, it is possible to detect intrusion of a burglar or the like reliably and with a simple structure, without need for a special sensor for human body detection provided to the base unit 100 or the handset 200 constituting the cordless telephone system.

Third Embodiment

In the following, a third embodiment of the present invention will be described with reference to the appended drawings.

In the first and second embodiments, monitoring was performed between the base unit 100 and the handset 200. In the third embodiment, monitoring is performed by use of radio waves transmitted and received between the first handset 201 and the second handset 202. Specifically, configuration is made such that data for monitoring (second control data) is transmitted from the first handset 201 and received by the second handset 202 using a slot for monitoring (second control slot) set between the first handset 201 and the second handset 202, and the second handset 202 measures the RSSI signal when the data for monitoring is received and detects an abnormality based on the measured RSSI signal.

Figure 13:
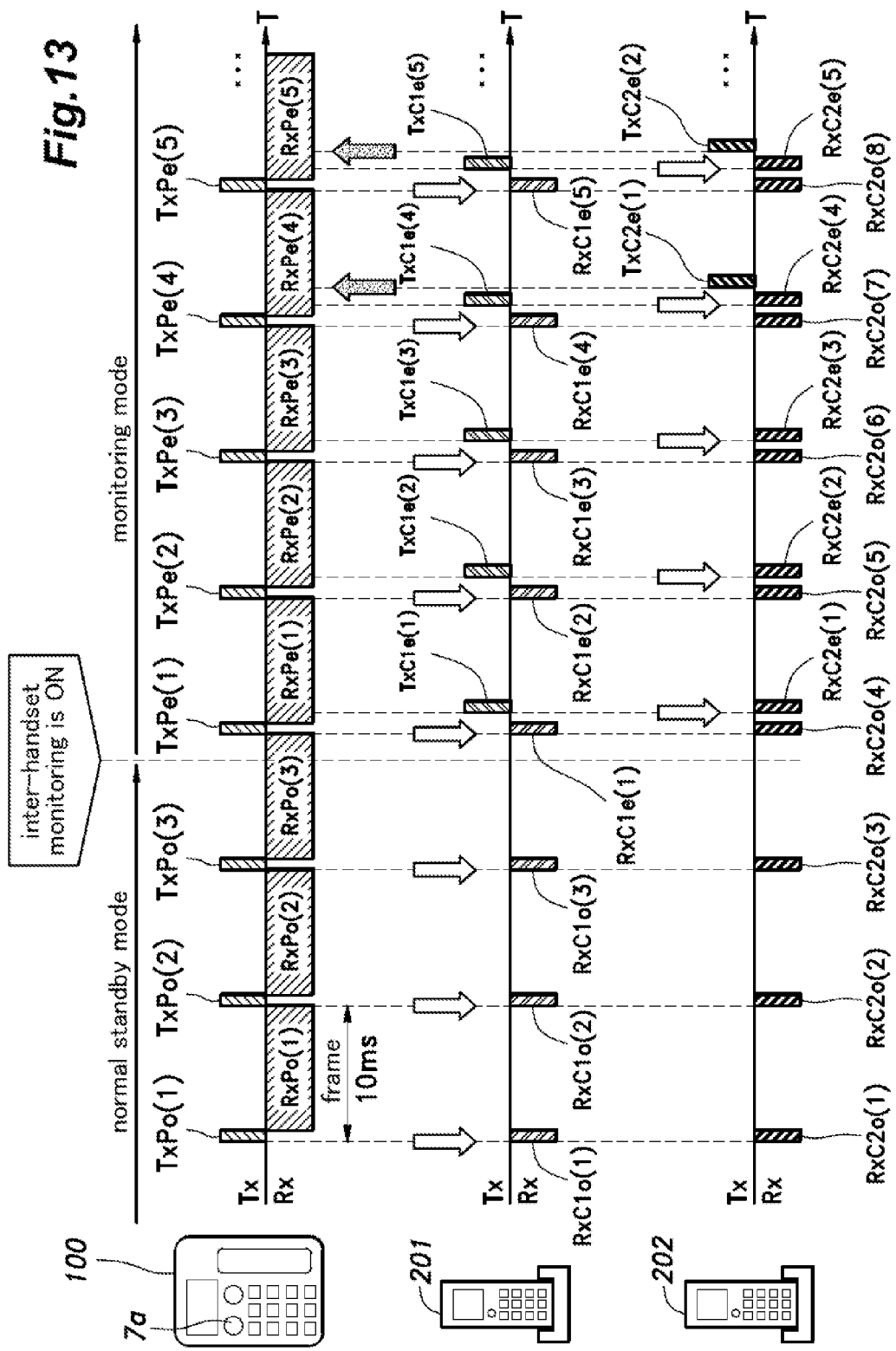
FIG. 13 is an explanatory diagram showing a mode of use of the slots used by the base unit, the first handset and the second handset during execution of a process relating to the security action in the cordless telephone system according to the third embodiment.

FIG. 13 is an explanatory diagram showing a mode of use of the slots used by the base unit 100, the first handset 201 and the second handset 202 during execution of a process relating to the security action in the cordless telephone system according to the third embodiment. In FIG. 13, initially the base unit 100, the first handset 201 and the second handset 202 are in the normal standby mode, and after it is designated by use of the operation unit 7 of the base unit 100 (see FIG. 2, etc.) to conduct monitoring using the first handset 201 and the second handset 202, the monitoring instruction button 7a is pressed at the timing of "inter-handset monitoring is ON" to start the monitoring. When the monitoring between the first handset 201 and the second handset 202 is started, the second handset 202 executes a process of acquiring the "standard value" explained above with reference to FIG. 9, but this process is not shown in FIG. 13 for the sake of simplicity (this applies to the fourth and fifth embodiments also).

Prior to the start of the monitoring, the transmission and reception between the base unit 100 and the first handset 201 as well as between the base unit 100 and the second handset 202 have been synchronize. The base unit 100 transmits control data in the control slot defined as the period TxPo(n), the first handset 201 receives the control data in the period RxC1o (n) which is in synchronization with the period TxPo(n), and similarly, the second handset 202 receives the control data in a period RxC2o(n) which also is in synchronization with the period TxPo(n). In this state, the control data does not contain the aforementioned "monitoring mode signal." It is to be noted that, though the first handset 201 and the second handset 202 are independently synchronized with the base unit 100, since in this embodiment the base unit 100 sets one control slot in each frame for both the first handset 201 and the second handset 202 (namely, multicast slot), the period RxC1o(n) and the period RxC2o(n) correspond to the same slot.

When the monitoring instruction button 7a of the base unit 100 is pressed to start the monitoring between the first handset 201 and the second handset 202, the base unit 100 transmits the control data containing the "monitoring mode signal" in the period TxPe(n) serving as the control slot, and the first handset 201 and the second handset 202 receive the control data in the period RxC1e(n) and the period RxC2o (n+3), respectively.

The first handset 201 that received the control data sets a period TxC1e(n) serving as a slot for monitoring (second control slot) for communication with the second handset 202 (the second handset 202 sets a corresponding period RxC2e (n)), and transmits data for monitoring (second control data) in the slot for monitoring. The data for monitoring may be NULL data or may have the same structure as that of the ordinary control data such that the aforementioned control data field 31 contains, for example, the ID of the first handset 201 and the ID of the second handset 202 for specifying the pair of handsets to perform the monitoring. Thus, the data for monitoring has an aspect similar to that of the control data.

Further, the data for monitoring may include the "monitoring mode signal" instructing execution of the monitoring, such that the "monitoring mode signal" is transmitted from the first handset 201 to the second handset 202, though this can be omitted when the "monitoring mode signal" is contained in the control data transmitted from the base unit 100 to both the first handset 201 and the second handset 202. In general, in a case where the control data containing the "monitoring mode signal" is transmitted from the base unit 100 to multiple handsets 200, the control data includes data (bits) for designating the roles of the handsets 200; specifically, which of the handsets 200 should serve as a master device (or transmitting unit) and which of the handsets 200 should serve as a slave device (or receiving unit). Accordingly, the handset 200 designated a master device serves as the first handset 201 in this embodiment and the handset 200 designated a slave device serves as the second handset 202 in this embodiment.

Upon receipt of the data for monitoring, the second handset 202 obtains the "standard value," and thereafter, starts obtaining the digital difference signal and calculating an average of the absolute values of the digital difference signal as described in the foregoing, based on the RSSI signal measured each time the data for monitoring is received. When an abnormality is detected, the second handset 202 performs the security action described above. Further, the second handset 202 transmits response data to the base unit 100 in a period TxC2e(n), which is a response slot corresponding to the period TxPe(n+3) in which the base unit 100 transmits the control data, for example, such that the base unit 100 can know, by analyzing the response data, that an abnormality is detected by the second handset 202. Consequently, the base unit 100 also performs the security action.

In the example shown in FIG. 13, the response data from the second handset 202 to the base unit 100 is first transmitted in the period TxC2e(1), which serves as a response slot corresponding to the period TxPe(4), and in a period TxPe(5) that follows, the base unit 100 notifies the first handset 201 that an abnormal state is detected. In response to this notification, the first handset 201 also performs the security action. Namely, when an abnormality is detected by the second handset 202, the base unit 100 and the first handset 201 also perform the security action such as setting off an alarm sound, for example.

In the third embodiment described above, monitoring (or determination on whether there is abnormality) is performed by the second handset 202 using the slot for monitoring in which the first handset 201 transmits the data for monitoring to the second handset 202. However, it is also possible that the second handset 202 be configured to return the data for monitoring to the first handset 201 using a response slot corresponding to the slot for monitoring, and the first handset 201 be configured to detect the radio wave strength in this response slot, such that it is determined that there is an abnormal state only when an abnormality is detected by both the first handset 201 and the second handset 202. Thereby, it is possible to avoid erroneous detection of an abnormal state due to the variation in the characteristics of the handsets.

Further, the structure shown in FIG. 13 may be modified such that, when the first handset 201 and the second handset 202 receive the control data transmitted from the base unit 100 in the period TxPe(n) serving as the control slot, the first handset 201 and the second handset 202 respectively measure the RSSI signal based on the radio waves from the base unit 100, in addition to the above described feature that the first handset 201 transmits the data for monitoring to the second handset 202, which in turn measures the RSSI signal based on the radio waves from the first handset 201. This allows the monitoring to be performed to cover a triangular area defined by the base unit 100, the first handset 201 and the second handset 202. In such a structure, the second handset 202 operates as a slave device for both the base unit 100 and the first handset 201, and therefore, it is preferred that the aforementioned "standard value" be obtained separately for each of the master devices (base unit 100 and first handset 201).

Fourth Embodiment

In the following, a fourth embodiment of the present invention will be described with reference to the appended drawings.

In the third embodiment adapted to perform the monitoring between the handsets 201 and 202, the base unit 100 is configured to transmit the control data in the control slot to both the first handset 201 and the second handset 202, and when the second handset detects an abnormality, the data indicating the abnormality detection is transmitted to the base unit 100. In the fourth embodiment, configuration is made such that an abnormality is detected by the second handset 202 measuring the RSSI signal, and when an abnormality is detected, it is notified from the second handset 202 to the first handset 201 first, and thereafter, notified from the first handset 201 to the base unit 100.

Figure 14:
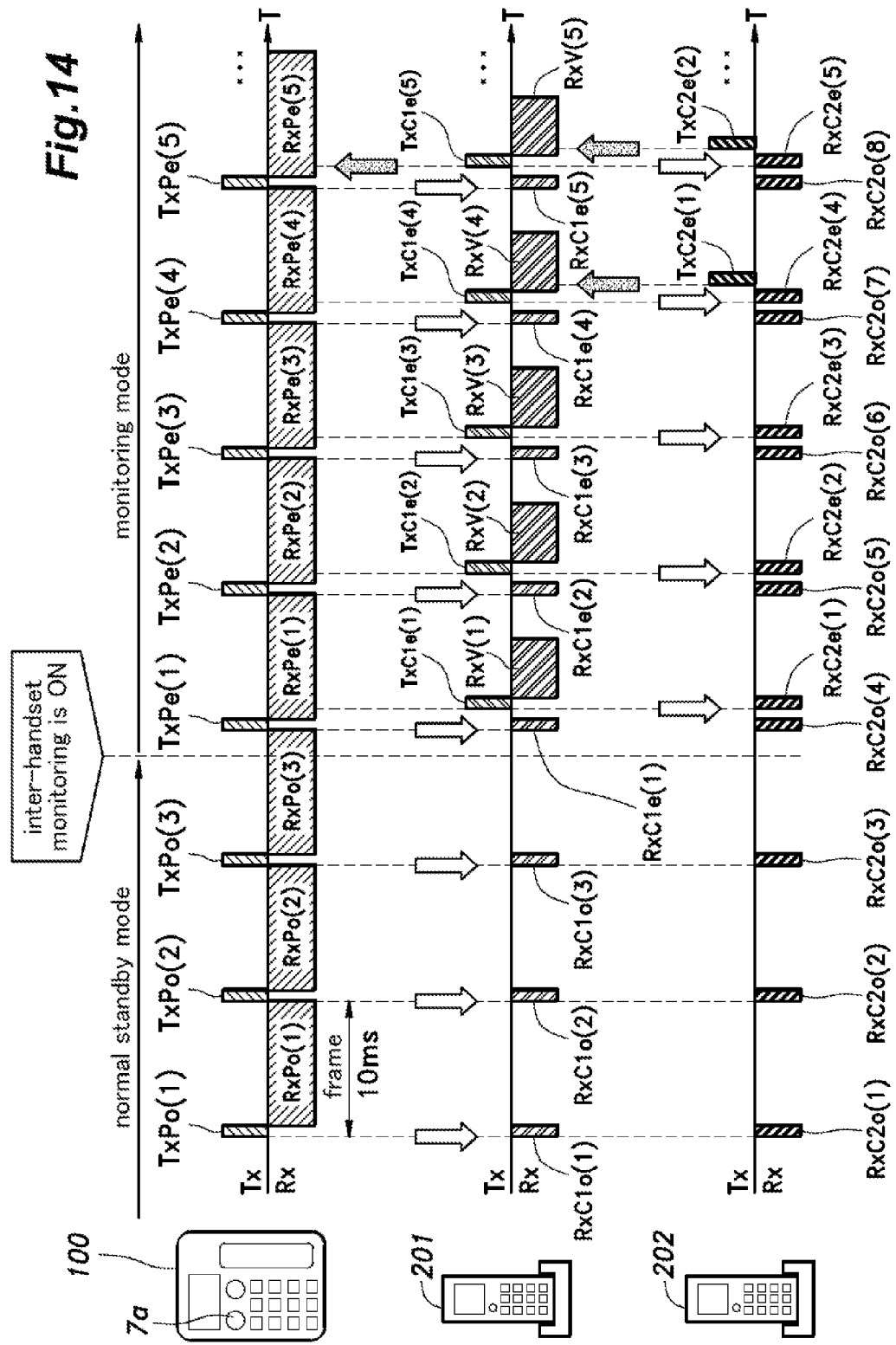
FIG. 14 is an explanatory diagram showing a mode of use of the slots used by the base unit, the first handset and the second handset during execution of a process relating to the security action in the cordless telephone system according to the fourth embodiment.

FIG. 14 is an explanatory diagram showing a mode of use of the slots used by the base unit 100, the first handset 201 and the second handset 202 during execution of a process relating to the security action in the cordless telephone system according to the fourth embodiment. In FIG. 14, the state before the start of the monitoring is the same as in the third embodiment, and therefore, explanation therefor is omitted.

When the monitoring instruction button 7a of the base unit 100 is pressed to start the monitoring between the first handset 201 and the second handset 202, the base unit 100 transmits the control data containing the "monitoring mode signal" in the period TxPe(n) serving as the control slot, and the first handset 201 and the second handset 202 receive the control data in the period RxC1e(n) and the period RxC2o(n+3), respectively.

The first handset 201 that received the control data sets a period TxC1e(n) serving as a slot for monitoring for communication with the second handset 202, and transmits data for monitoring in the slot for monitoring. The structure of the data for monitoring is the same as in the third embodiment. After transmitting the data for monitoring to the second handset 202, the first handset 201 receives response data from the second handset 202 in the response slot corresponding to the slot for monitoring, as described below.

Upon receipt of the data for monitoring, the second handset 202 starts the monitoring, and when an abnormality is detected thereafter, performs the security action, and transmits response data to the first handset 201 in a period TxC2e(n), which is a response slot corresponding to the slot for monitoring (TxC1e(n+3)) in which the first handset 201 transmits the data for monitoring. The first handset 201 recognizes that an abnormality is detected by the second handset 202 by analyzing the response data. Consequently, the first handset 201 also performs the security action. Further, in the period TxC1e(5), for example (it is assumed that an abnormality is detected and the response data from the second handset 202 is transmitted immediately before the period TxC1e(5), as in the third embodiment), the first handset 201 notifies to the base unit 100 that "the second handset 202 has detected an abnormality." At this time, the data transmitted in the period TxC1e(5) is received by both the base unit 100 and the second handset 202 (the period TxC1e(n) is used as a so-called multicast slot). Thereby, the base unit 100 can recognize indirectly that the second handset 202 has detected an abnormality, and the base unit 100 also performs the security action.

As described in the foregoing, in the fourth embodiment, the information indicating that the second handset 202 has detected an abnormality is passed from the second handset 202 to the first handset 201 to the base unit 100 in a bucket brigade manner. In an application of this technique, it is possible to perform monitoring covering a long space having a dimension on the order of several hundred meters by arranging multiple handsets 200 along the space at a rate of one handset 200 every 30 meters, for example, even if the handsets 200 at either end of the space are positioned outside the service range of the base unit 100 guaranteed in the cordless telephone system.

Fifth Embodiment

In the following, a fifth embodiment of the present invention will be described with reference to the appended drawings.

In the first to fourth embodiments, the base unit 100 transmits to the handsets 200 (including the first handset 201 and the second handset 202) control data in the period serving as the control slot, and the monitoring is performed based on the control data. In the fifth embodiment, the first handset 201 and the second handset 202 are configured to conduct monitoring without intervention of the base unit 100.

FIG. 15 is an explanatory diagram showing a mode of use of the slots used by the first handset 201 and the second handset 202 during execution of a process relating to the security action in the cordless telephone system according to the fifth embodiment. In FIG. 15, it is assumed that the first handset 201 and the second handset 202 are located where they cannot receive the control data from the base unit 100, namely, outside the range of the base unit 100 (though the fifth embodiment may be applicable to the situation in which the handsets 201 and 202 are located where they can communicate with the base unit 100).

Under this circumstance, when the monitoring instruction button 15a of the first handset 201 is pressed, the first handset 201 sets a period TxC1e(n) serving as a control slot (or slot for monitoring) coinciding with the timing (period) used for reception prior to the pressing of the monitoring instruction button 15a, and then transmits the control data containing the "monitoring mode signal" to the second handset 202 in the control slot (TxC1e(n)). The control slot and the frequency band used by the first handset 201 may be the same as those used by the base unit 100 immediately before the first handset 201 is moved outside the range of the base unit 100, for example (the first handset 201 (as well as the second handset 202) has obtained these pieces of information to receive the control data from the base unit 100 when it was within the range of the base unit 100). Alternatively, it is also possible that, upon instruction of execution of the inter-handset monitoring, the first handset 201 and the second handset 202 initiate a process for establishing synchronization therebetween and determining their roles (master or slave).

Upon receipt of the control data containing the "monitoring mode signal," the second handset 202 obtains the "standard value," and thereafter, starts obtaining the digital difference signal and calculating an average of the absolute values of the digital difference signal as described in the foregoing, based on the RSSI signal measured each time the control data is received. When an abnormality is detected, the second handset 202 performs the security action described above. Further, the second handset 202 transmits response data to the first handset 201 in a period TxC2e(n), which is a response slot corresponding to the period TxC1e(n+3) serving as the control slot, such that the first handset 201 can know, by analyzing the response data, that an abnormality is detected by the second handset 202. Consequently, the base unit 100 also performs the security action.

As described in the foregoing, in the third to fifth embodiments, a slot for monitoring is provided for communicating data for monitoring between the handsets, and monitoring is performed using the result of measurement of the radio wave strength performed in the slot for monitoring. As the first handset 201 and the second handset 202 are portable, they can be readily placed where the monitoring is needed. For example, the first handset 201 and the second handset 202 may be disposed on either side of a window or a door of a house to detect a suspicious person or the like entering the house through the window or the door.

In each of the foregoing embodiments, what is to be detected in the monitoring is "presence of a person (particularly, movement of a human body) where there should be none." On the other hand, the present invention can also be used to detect "absence of a person (particularly, no movement of a human body) where there should be one." In such a case, when there is no change in the aforementioned digital difference signal for a predetermined period of time, this may be regarded as an abnormality and notification may be made accordingly, for example. In this way, the cordless telephone system and the monitoring system according to the present invention can be used to monitor (supervise) the status of those who need care or supervision, for example.

In the foregoing, detailed description has been made of the cordless telephone system and the monitoring system according to the present invention in terms of the concrete embodiments. However, these embodiments are mere examples and the present invention should not be limited to these embodiments. For example, in the foregoing embodiments, the system includes two handsets, but the system may include more than two handsets. It should be noted that not all of the structural elements illustrated in the foregoing embodiments are necessarily indispensable, and they may be selectively used as appropriate within the scope of the present invention.

The cordless telephone system and the monitoring system according to the present invention make it possible, by use of the base unit and a handset and/or by use of handsets constituting the system, to detect intrusion of a burglar or the like reliably and with a simple structure, without need for a special sensor for human body detection provided to the base unit or any handset of the system. The system according to the present invention can be embodied based on a cordless telephone system adopting DECT, PHS, sPHS, etc. and favorably used for monitoring purpose.

The contents of the original Japanese patent application on which the Paris Convention priority claim is made for the present application as well as the contents of the prior art references mentioned in this application are incorporated in this application by reference.

The invention claimed is:

1. A cordless telephone system, comprising:
a base station connected to a telephone line; and
a first handset configured to transmit and receive radio waves to and from the base station via wireless channel,
wherein at least one of the base station and the first handset includes:
strength measurement circuitry configured to measure a strength of received radio waves; and
a controller configured to perform a prescribed security action based on a result of measurement performed by the strength measurement circuitry indicating the received radio waves have interfered with each other causing strength of the received radio waves to fluctuate.

2. The cordless telephone system according to claim 1, wherein:
the strength measurement circuitry and the controller are provided to the first handset;
the base station and the first handset perform transmission and reception based on time division multiple access; and
the controller is configured to perform the prescribed security action based on a result of measurement performed by the strength measurement circuitry when control data transmitted from the base station is received by the first handset.

3. The cordless telephone system according to claim 1, wherein the controller is configured to obtain in advance a standard value of radio wave strength measured by the strength measurement circuitry, and to perform the prescribed security action when a difference between a measured value of the radio wave strength and the standard value exceeds a predetermined threshold value.

4. The cordless telephone system according to claim 1, wherein the prescribed security action includes at least one of setting off an alarm sound, outputting a predetermined message, making a phone call to a predetermined party, and making notification via the wireless channel.

5. The cordless telephone system according to claim 1, wherein
the handset includes the strength measurement circuitry and the controller;
the strength measurement circuitry configured to measure the strength of the received radio waves of a control slot which is used for synchronization between the base station and the handset; and
the controller transmits to the base station the result of measurement performed by the strength measurement circuitry, the result is included in a response slot corresponding to the control slot.

6. The cordless telephone system according to claim 1, wherein
a communication method between the base station and the handset when the controller performs the prescribed security action is the same as when the controller does not perform the prescribed security action.

7. A cordless telephone system, comprising:
a base station connected to a telephone line; and
a first handset and a second handset each configured to transmit and receive radio waves to and from the base station via wireless channel,
wherein the first handset and the second handset transmit and receive radio waves to and from each other via wireless channel,
and wherein the second handset comprises:
strength measurement circuitry configured to measure a strength of radio waves transmitted from the first handset; and
a controller configured to perform a prescribed security action based on a result of measurement performed by the strength measurement circuitry indicating the received radio waves have interfered with each other causing strength of the received radio waves to fluctuated.

8. The cordless telephone system according to claim 7, wherein:
the first handset and the second handset perform transmission and reception based on time division multiple access;
the first handset transmits to the second handset data for the measurement of the radio wave strength at a timing different from a timing at which control data is transmitted or received between the base station and the first handset; and
the controller is configured to perform the prescribed security action based on a result of measurement performed by the strength measurement circuitry when the data is received by the second handset.

9. A monitoring system, comprising:
a transmitter configured to emit radio waves; and
a receiver placed apart from the transmitting unit and configured to receive the radio waves emitted from the transmitting unit,
wherein the receiving unit comprises:
a strength measurement circuitry configured to measure a strength of the received radio waves; and
a controller configured to perform a prescribed security action based on a result of measurement performed by the strength measurement circuitry indicating the received radio waves have interfered with each other causing strength of the received radio waves to fluctuate.

10. The monitoring system according to claim 9, wherein
the strength measurement circuitry configured to measure the strength of the received radio waves of a control slot which is used for synchronization between the transmitter and the receiver; and
the controller transmits to the transmitter the result of measurement performed by the strength measurement circuitry, the result is included in a response slot corresponding to the control slot.

11. The cordless telephone system according to claim 7, wherein
a communication method between the transmitter and the receiver when the controller performs the prescribed security action is the same as when the controller does not perform the prescribed security action.

* * * * *